(12) United States Patent
Yamada

(10) Patent No.: US 10,501,045 B2
(45) Date of Patent: Dec. 10, 2019

(54) AIRBAG DEVICE FOR A FRONT PASSENGER SEAT

(71) Applicant: TOYODA GOSEI CO., LTD., Kiyosu-shi, Aichi-ken (JP)

(72) Inventor: Ikuo Yamada, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 112 days.

(21) Appl. No.: 15/657,636

(22) Filed: Jul. 24, 2017

(65) Prior Publication Data
US 2018/0029557 A1 Feb. 1, 2018

(30) Foreign Application Priority Data
Jul. 29, 2016 (JP) .................... 2016-150563

(51) Int. Cl.
*B60R 21/2338* (2011.01)
*B60R 21/205* (2011.01)
(Continued)

(52) U.S. Cl.
CPC ........ *B60R 21/2338* (2013.01); *B60R 21/205* (2013.01); *B60R 21/235* (2013.01);
(Continued)

(58) Field of Classification Search
CPC . B60R 21/2338; B60R 21/231; B60R 21/233; B60R 21/205; B60R 2021/23386; B60R 2021/23538; B60R 2021/0004; B60R 2021/0048; B60R 2021/0009; B60R 2021/23576; B60R 2021/0023; B60R 2021/23308
USPC ................ 280/743.2, 743.1, 732, 730.1, 729
See application file for complete search history.

(56) References Cited

U.S. PATENT DOCUMENTS 6,302,433 B1* 10/2001 Ellerbrok .............. B60R 21/233
280/729
2003/0178239 A1* 9/2003 Takimoto ............ B60R 21/2338
180/274
(Continued)

FOREIGN PATENT DOCUMENTS

JP 03-032956 A 2/1991
JP 2005-96653 A 4/2005
(Continued)

OTHER PUBLICATIONS

Office Action dated Jun. 19, 2019 issued in corresponding JP patent application No. 2016-150563 (and English translation).

*Primary Examiner* — Keith J Frisby
(74) *Attorney, Agent, or Firm* — Posz Law Group, PLC

(57) ABSTRACT

An airbag includes a main inflatable section which includes a front-collision arresting face at the rear plane as deployed, a protruding inflatable section which includes an oblique-collision arresting face, and an arresting recess formed between the front-collision arresting face and oblique-collision arresting face. An outer tether is disposed on the outside of the airbag for preventing the protruding inflatable section from moving away from the main inflatable section at airbag deployment. The outer tether includes a side edge disposed towards the protruding inflatable section and a front edge disposed towards the main inflatable section. The side edge is jointed to an upper edge of the oblique-collision arresting face by a side joint which is formed over a generally entire area in a front and rear direction of the protruding inflatable section. The front edge is jointed to an upper edge of the front-collision arresting face by a front joint.

8 Claims, 23 Drawing Sheets

(51) Int. Cl.
*B60R 21/235* (2006.01)
*B60R 21/00* (2006.01)

(52) U.S. Cl.
CPC ............... *B60R 2021/0004* (2013.01); *B60R 2021/0009* (2013.01); *B60R 2021/0023* (2013.01); *B60R 2021/0048* (2013.01); *B60R 2021/23386* (2013.01); *B60R 2021/23576* (2013.01)

(56) References Cited

U.S. PATENT DOCUMENTS

| | | | |
|---|---|---|---|
| 2003/0184069 A1* | 10/2003 | Takimoto | B60R 21/217 280/743.1 |
| 2014/0318881 A1 | 10/2014 | Sugimoto et al. | |
| 2016/0039385 A1* | 2/2016 | Watamori | B60R 21/23138 280/730.1 |
| 2018/0065587 A1* | 3/2018 | Maenishi | B60R 21/205 |

FOREIGN PATENT DOCUMENTS

| | | |
|---|---|---|
| JP | 2006-256508 A | 9/2006 |
| JP | 2007-216733 A | 8/2007 |
| JP | 4274742 B2 | 6/2009 |
| JP | 2015-157616 A | 9/2015 |
| JP | 2016-020116 A | 2/2016 |
| WO | 2016002384 A1 | 1/2016 |
| WO | 2016/147682 A1 | 9/2016 |
| WO | 2016/147683 A1 | 9/2016 |
| WO | 2016/147684 A1 | 9/2016 |
| WO | 2016/147732 A1 | 9/2016 |

* cited by examiner

Sectional view taken at A-A

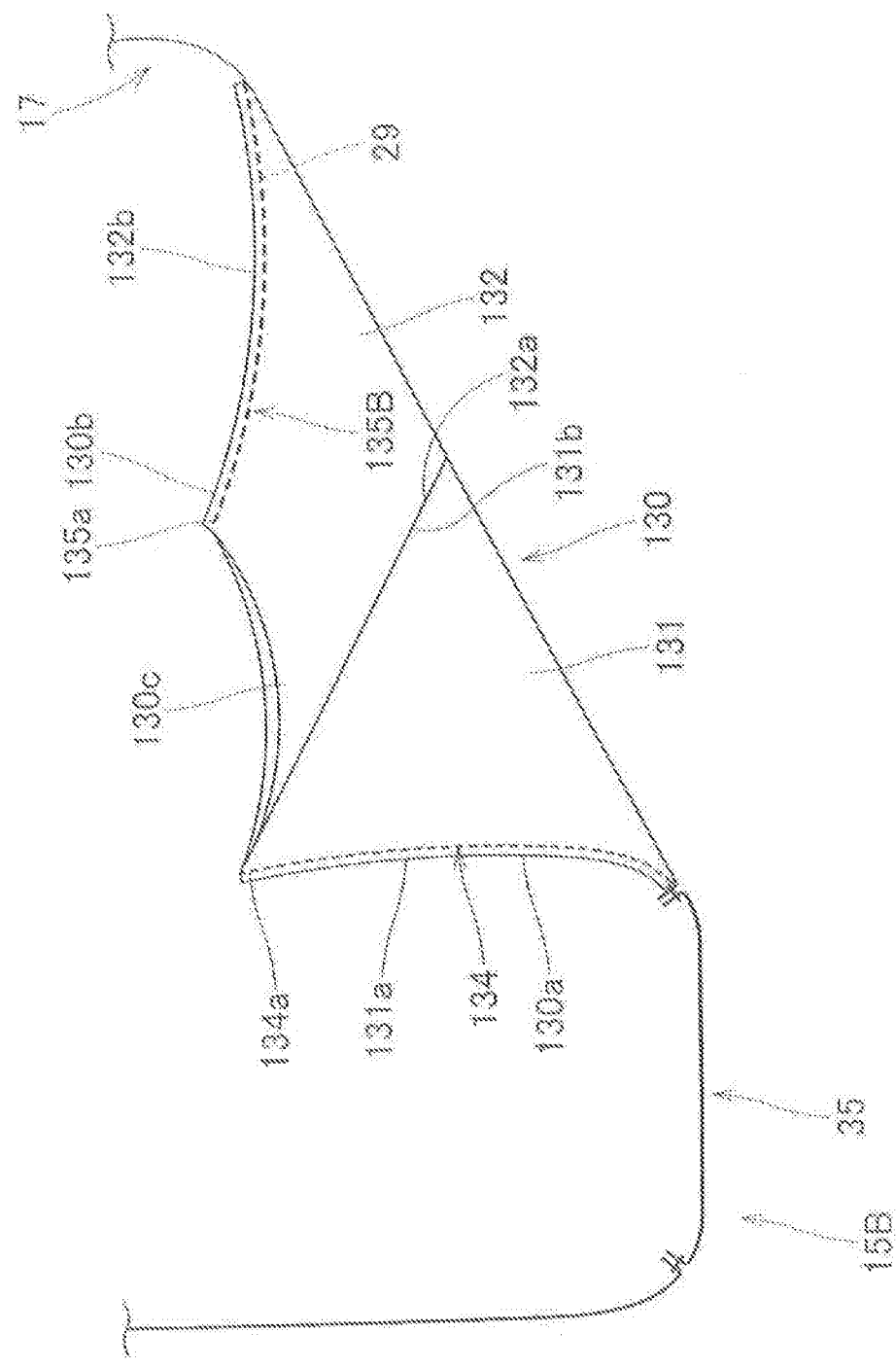

AIRBAG DEVICE FOR A FRONT PASSENGER SEAT

CROSS REFERENCE TO RELATED APPLICATIONS

The Present application claims priority from Japanese Patent Application No. 2016-150563 of Yamada, filed on Jul. 29, 2016, the entire disclosure of which is incorporated herein by reference.

BACKGROUND OF THE INVENTION

1. Field of the Invention

The present invention relates to an airbag device for a front passenger seat adapted to be mounted on an instrument panel of a vehicle in front of the front passenger seat. More particularly, the invention relates to an airbag device for a front passenger seat including an airbag which is housed in a housing in a folded-up configuration and deployable rearward for protecting a passenger when fed with an inflation gas.

2. Description of Related Art

WO 2016/002384 A1 discloses a known airbag device for a front passenger seat whose airbag includes a main inflatable section which is deployable towards a front passenger seat, a center bag section which is deployable on an inboard side of the main inflatable section, and a tether belt which connects the top plane of the main inflatable section and the top plane of the center bag section. The airbag further includes a slit between the main inflatable section and the center bag section for receiving the head of a passenger as he moves diagonally forward in the event of an oblique collision or an offset collision, etc. The tether belt is connected, by the first end, to a rear portion of the center bag section, more specifically, to a region of the center bag section located farther rearward than the slit. The tether belt helps restrain a movement of the main inflatable section and the center bag section after the airbag has caught the passenger's head by the slit.

In the above known airbag device, the tether belt is formed into a band, and the first end of the tether belt is connected to the top plane of the rear portion of the center bag section. With this configuration, if the passenger's head is brought into contact with a region of the center bag section located farther forward than a joint of the tether belt to the center bag section, the center bag section pushed by the head is liable to bulge outwardly partially and fail to guide the head into the slit smoothly, especially when, by way of example, the passenger moves diagonally forward at a high speed.

SUMMARY OF THE INVENTION

An object of the present invention is to provide an airbag device for a front passenger seat capable of protecting a passenger with an airbag smoothly when he moves diagonally forward.

The object of the invention will be achieved by a following airbag device for a front passenger seat:

The airbag device for a front passenger seat is adapted to be mounted on an instrument panel of a vehicle in front of a front passenger seat, and includes a housing adapted to be disposed in the instrument panel and an airbag which is housed in the housing in a folded-up configuration. The airbag is inflatable with an inflation gas for rearward deployment, and includes a main inflatable section deployable rearward out of the housing, an auxiliary inflatable section which is deployable on a left or right side of the main inflatable section, and a protruding inflatable section which is deployable at the rear of the auxiliary inflatable section in such a manner as to protrude further rearward than the main inflatable section.

A rear plane of the main inflatable section serves as a front-collision arresting face for protecting a head of a passenger in the event of a frontal collision of the vehicle. The protruding inflatable section includes a near-side wall which rises rearward out of the front-collision arresting face and faces towards the front-collision arresting face at airbag deployment. The near-side wall serves as an oblique-collision arresting face for protecting the head of the passenger as he moves diagonally forward in the event of an oblique collision or an offset collision of the vehicle.

The front-collision arresting face and oblique-collision arresting face form a passenger protection region, and the passenger protection region further includes an arresting recess between the front-collision arresting face and the oblique-collision arresting face. The arresting recess is recessed forward for receiving and arresting the head of the passenger.

The airbag further includes, on an outside of the main inflatable section and protruding inflatable section, an outer tether for preventing the protruding inflatable section from moving away from the main inflatable section at airbag deployment. The outer tether has a generally sectorial outer contour, and includes:

- a side edge which is disposed over a generally entire area in a front and rear direction of an upper edge region of the near-side wall of the protruding inflatable section;
- a side joint which joints the side edge of the outer tether to an upper edge region of the oblique-collision arresting face and is formed over a generally entire area in a front and rear direction of the protruding inflatable section;
- a front edge; and
- a front joint which joints the front edge of the outer tether to an upper edge region of the front-collision arresting face of the main inflatable section.

In the airbag device for a front passenger seat of the invention, the airbag includes the outer tether on the outside of the main inflatable section and protruding inflatable section for preventing the protruding inflatable section, which is deployable in such a manner as to protrude further rearward than the main inflatable section, from moving away from the main inflatable section at airbag deployment. The outer tether is formed into a generally sectorial outer contour, and the side edge of the outer tether is jointed to the upper edge region of the protruding inflatable section while the front edge is jointed to the upper edge region of the main inflatable section. The side edge is disposed over a generally entire area in a front and rear direction of the upper edge region of oblique-collision arresting face of the protruding inflatable section and is jointed to the upper edge of the oblique-collision arresting face all over by the side joint. With this configuration, in the event that the head of a passenger pushes the oblique-collision arresting face diagonally forward forcefully, the outer tether will prevent a part of the protruding inflatable section from moving away from the main inflatable section such that the oblique-collision arresting face can smoothly guide the head towards the arresting face.

When the head of the passenger is thus guided into the arresting recess by the oblique-collision arresting face, at least a part of the head will thrust itself into the arresting recess while opening the recess toward the left and right, such that the head will be caught by a large arresting area composed of inner surfaces of the arresting recess on the front, left and right sides. Moreover, since the arresting recess will contact both laterals of the head, it will not turn the head in a left and right direction. As a consequence, the airbag device of the invention will catch the passenger's head smoothly with the arresting recess in the event of an oblique collision or an offset collision. Further, in the airbag device, the side edge of the outer tether is jointed to a generally entire area in a front and rear direction of the upper edge of the oblique-collision arresting face of the protruding inflatable section. With this configuration, in the event that the passenger's head pushes the protruding inflatable section toward a direction away from the main inflatable section when guided by the oblique-collision arresting face and going into the arresting recess, the outer tether will prevent a rear end portion of the protruding inflatable section from opening towards a direction away from the main inflatable section, such that the arresting recess will protect the head adequately. Moreover, the outer tether connects the upper edges of the protruding inflatable section and main inflatable section, in other words, the outer tether is disposed above the arresting recess. With this configuration, the arresting recess will not be affected by the outer tether and will receive the passenger's head smoothly. At a frontal collision of the vehicle, the airbag of the airbag device of the invention will catch the passenger's head with the front-collision arresting face.

Therefore, the airbag device for a front passenger seat of the invention is capable of protecting the passenger with the airbag smoothly as he moves diagonally forward.

In the airbag device for a front passenger seat of the invention, it is desired that the front joint of the outer tether is continuous with a front end of the side joint and is formed generally all over the front edge of the outer tether. That is, it is desired that the side edge and front edge of the outer tether is wholly jointed to the upper edge regions of the protruding inflatable section and main inflatable section above the arresting recess. This configuration will further adequately help prevent the protruding inflatable section from moving away from the main inflatable section when the passenger's head goes into the arresting recess.

Alternatively, the front joint may be formed separately from the front end of the side joint, such that the front edge of the outer tether has an unjointed region between the front end of the side joint and the front joint.

If the auxiliary inflatable section is formed only either on the left side or on the right side of the main inflatable section as deployed, the front edge of the outer tether may be disposed over a generally entire area in a left and right direction of the main inflatable section.

In the airbag device for a front passenger seat of the invention, it is desired to form the outer tether out of two components; a protruding-side component to be disposed towards the protruding inflatable section and a main-side component to be disposed towards the main inflatable section, and to form the outer tether by jointing together a far-side edge of the protruding-side component located away from the side joint and a far-side edge of the main-side component located away from the front joint.

This configuration will facilitate a jointing work of the outer tether to the protruding inflatable section and main inflatable section in the production of the airbag in comparison with an instance where the outer tether is composed of a single piece of sheet material. The above configuration will also enable a fine adjustment of a length of the outer tether (i.e., a distance between the side joint and front joint) in the production of the airbag by varying a size of a seam allowance of the far-side edges of the protruding-side component and main-side component.

Furthermore, if the seam allowance of the far-side edges of the protruding-side component and main-side component is located on an upper side of the outer tether, the seam allowance will be prevented from being engaged with the passenger's head at airbag deployment.

BRIEF DESCRIPTION OF DRAWINGS

FIG. 24 is a partial enlarged schematic horizontal sectional view of the airbag of FIG. 23 showing the disposition of an outer tether.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
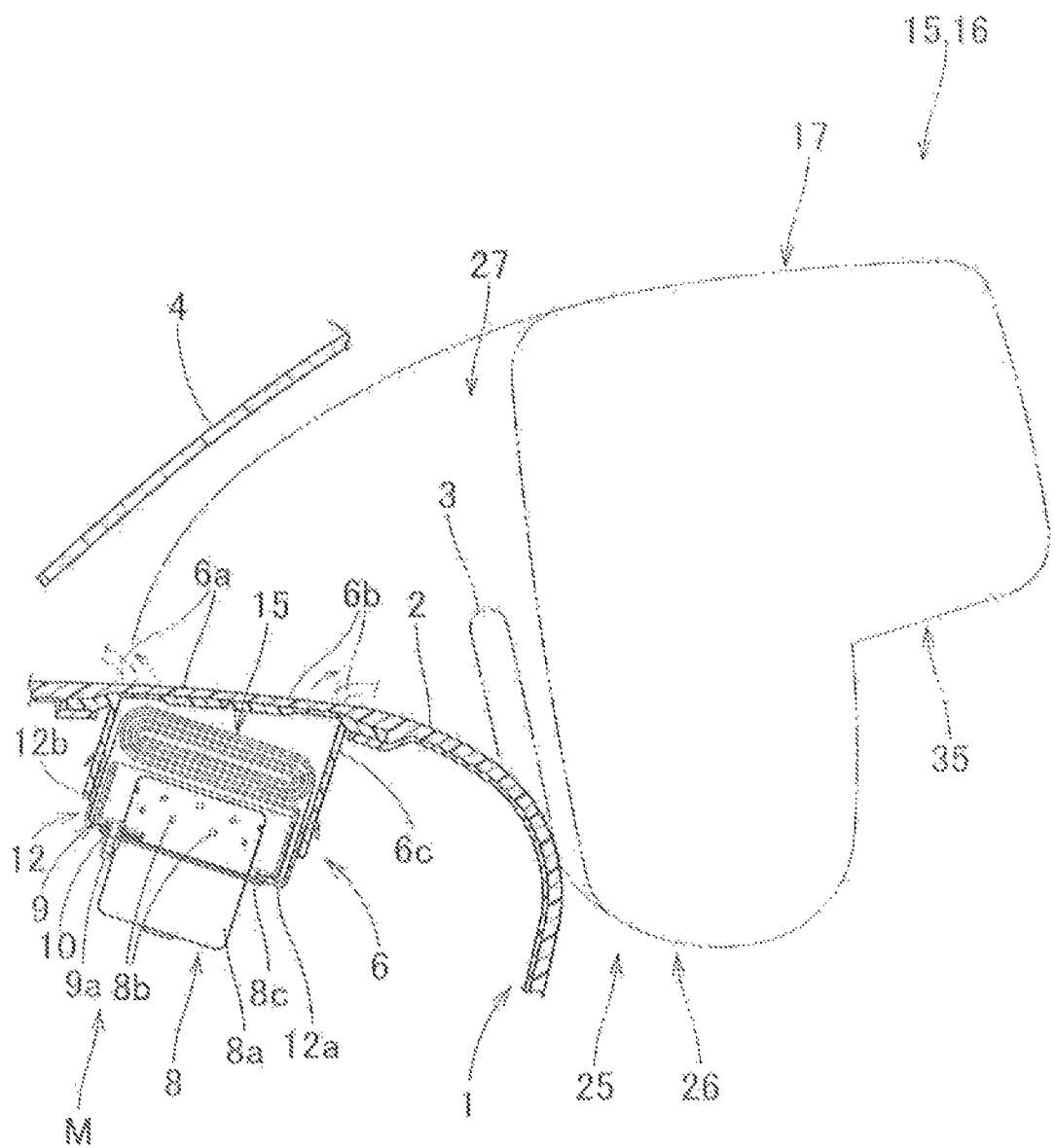
FIG. 1 is a schematic vertical section of an airbag device for a front passenger seat embodying the invention as mounted on a vehicle.
Figure 2:
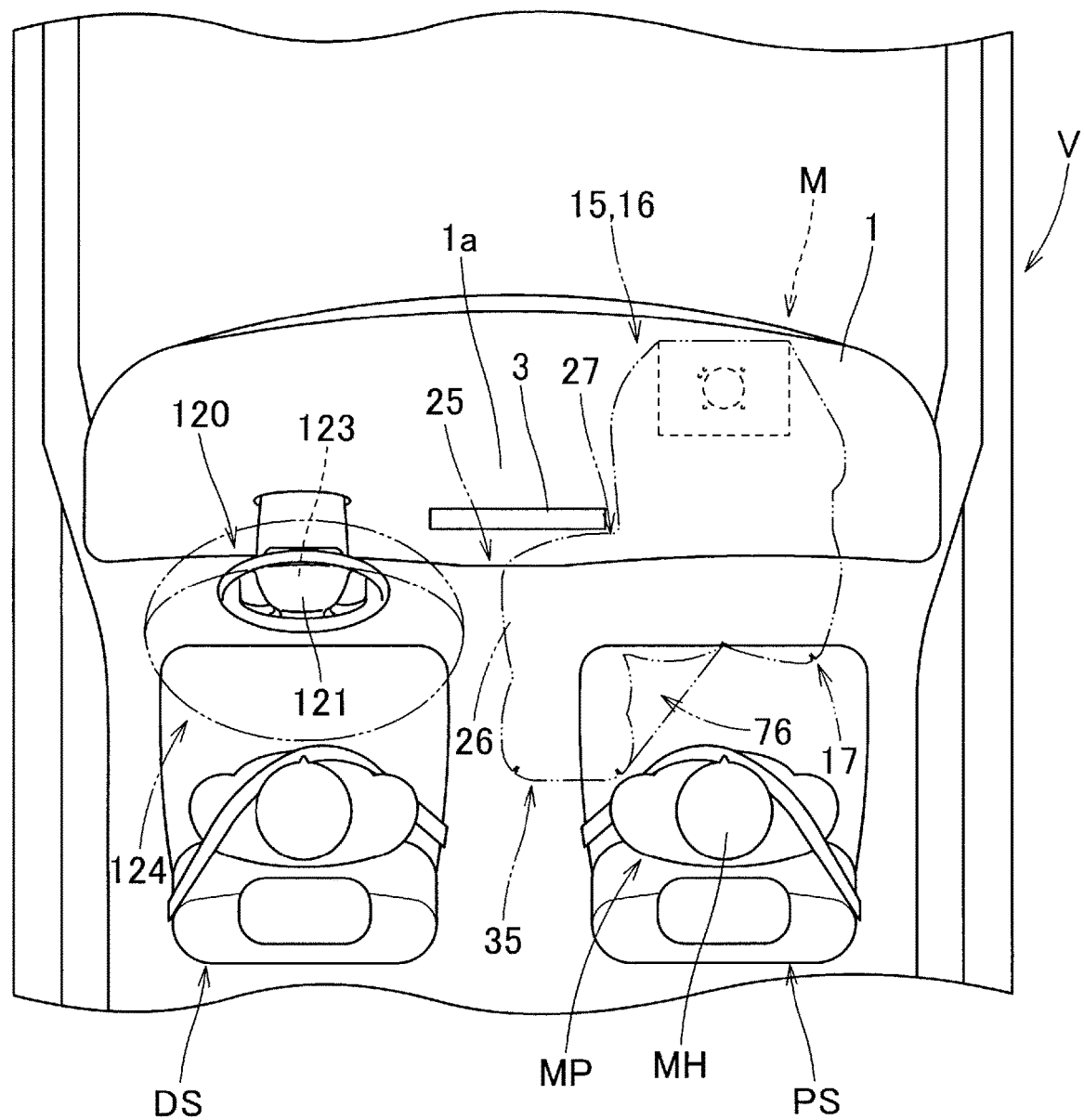
FIG. 2 is a schematic plan view of the airbag device of FIG. 1 as mounted on the vehicle.

FIGS. 1 and 2 depict an airbag device M for a front passenger seat embodying the invention as mounted on a vehicle V. The airbag device M is a top-mount airbag device stored inside a top plane 2 of an instrument panel or dashboard 1 in front of a front passenger seat PS of the vehicle V. The vehicle V is equipped with a car navigation system. A monitor 3 of the car navigation system is disposed in a vicinity of the rear end of a central region 1a of the dashboard 1 in such a manner as to protrude upward partially out of the top plane 2 of the dashboard 1, as shown in FIGS. 1 and 2. Specifically, the monitor 3 is located on the left side of a case (housing) 12 of the airbag device M (in other words, in a vicinity of the center in a width direction of the vehicle V and in front of a region between the driver's seat DS and front passenger seat PS). Unless otherwise specified, front-rear, up-down and left-right directions in this specification are intended to refer to front-rear, up-down and left-right directions of the vehicle V.

As shown in FIG. 1, the airbag device M includes an airbag 15, which is folded up, an inflator 8 for supplying the airbag 15 with an inflation gas, a case or housing 12 for housing and holding the airbag 15 and inflator 8, a retainer 9 for mounting the airbag 15 and inflator 8 on the case 12 and an airbag cover 6 for covering the airbag 15.

The airbag cover 6 is integral with the dashboard 1 made from synthetic resin and includes two doors, i.e. front and rear doors 6a and 6b, which are designed to open when pushed by the airbag 15 upon airbag deployment. The airbag cover 6 further includes, around the doors 6a and 6b, a joint wall 6c which is coupled to the case 12.

As shown in FIG. 1, the inflator 8 includes a main body 8a which is formed into a generally pot-like shape and provided with a plurality of gas discharge ports 8b, and a flange 8c for attachment to the case 12. The inflator 8 of this specific embodiment is designed to be actuated in the event of a frontal collision, an oblique collision or an offset collision of the vehicle V.

As shown in FIG. 1, the case or housing 12 is made of sheet metal into a generally rectangular parallelepiped having a rectangular opening at the top, and includes a generally rectangular bottom wall 12a which the inflator 8 is inserted into and mounted on from below and a circumferential wall 12b which extends upward from the outer edge of the bottom wall 12a and retains the joint wall 6c of the airbag cover 6. The airbag 15 and inflator 8 are attached to the bottom wall 12a of the case 12 by locating the retainer 9 inside the airbag 15 such that bolts (fixing means) 9a of the retainer 9 go through the periphery of a later-described gas inlet port 21 of the airbag 15, the bottom wall 12a of the case 12 and flange 8c of the inflator 8 and by fastening the bolts 9a with nuts 10. Further, unillustrated brackets are provided on the bottom wall 12a for mounting on a vehicle body structure.

Referring to FIGS. 3 to 15, the airbag 15 includes a bag body 16 inflatable with an inflation gas, and tethers 50, 54, 55, 57, 67, 68, 70 and 72 which are disposed inside the bag body 16 for controlling the contour of the bag body 16 as fully inflated, and an outer tether 76 which is disposed outside of the bag body 16.

The bag body 16 is fabricated of a sheet material having flexibility. As shown in FIGS. 3 to 6, the bag body 16 includes a main inflatable section 17, an auxiliary inflatable section which is deployable on the left side of the main inflatable section 17, and a protruding inflatable section 35 which is deployable at the rear of the auxiliary inflatable section in such a manner as to protrude farther rearward than the main inflatable section 17. In the illustrated embodiment, the auxiliary bag section is composed of a later-described left region 25 which is integral with the main inflatable section 17 and is disposed on the left side of the main inflatable section 17.

Figure 3:
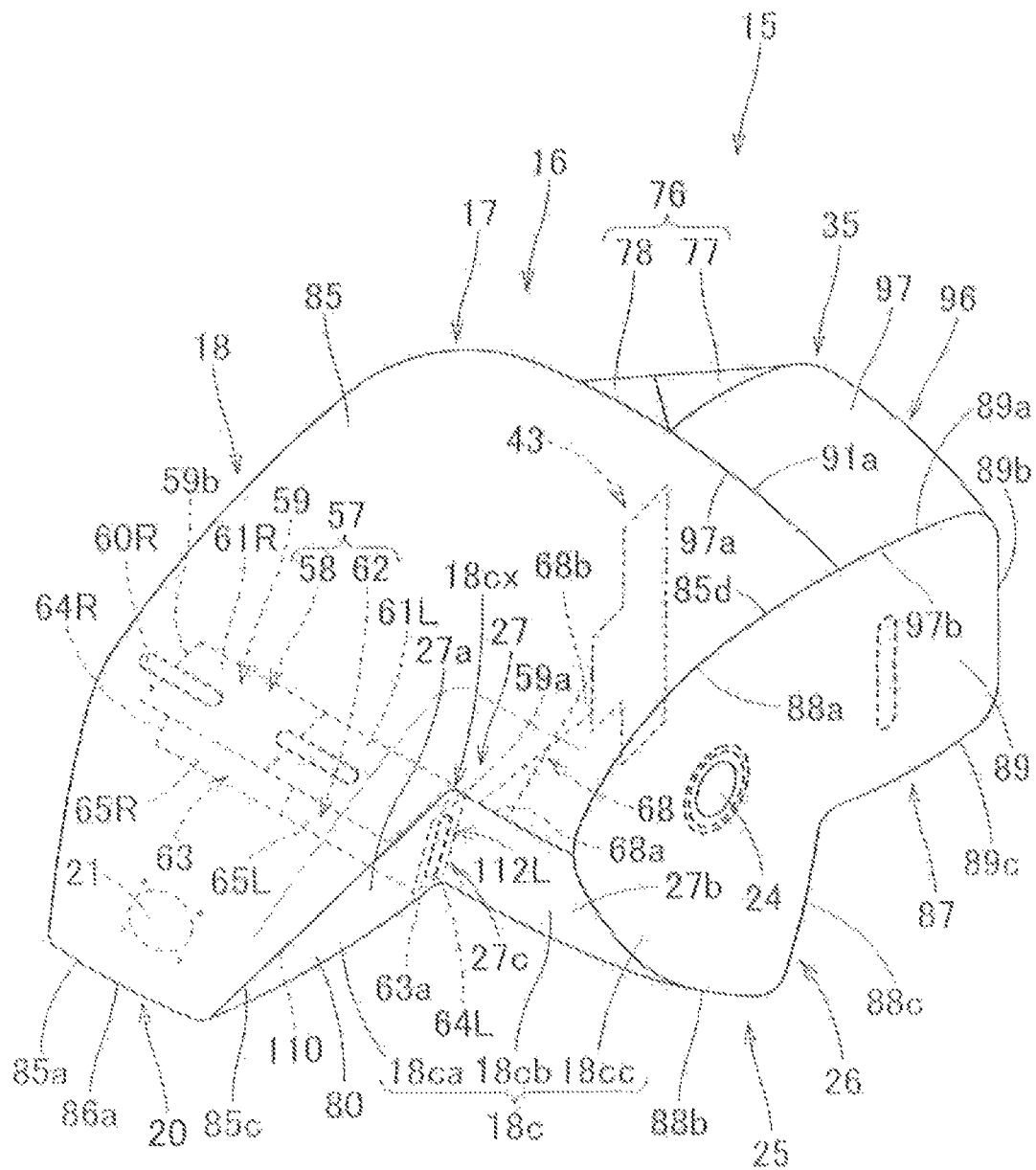
FIG. 3 is a perspective view of an airbag for use in the airbag device of FIG. 1 as inflated by itself, viewed from left front direction.
Figure 4:
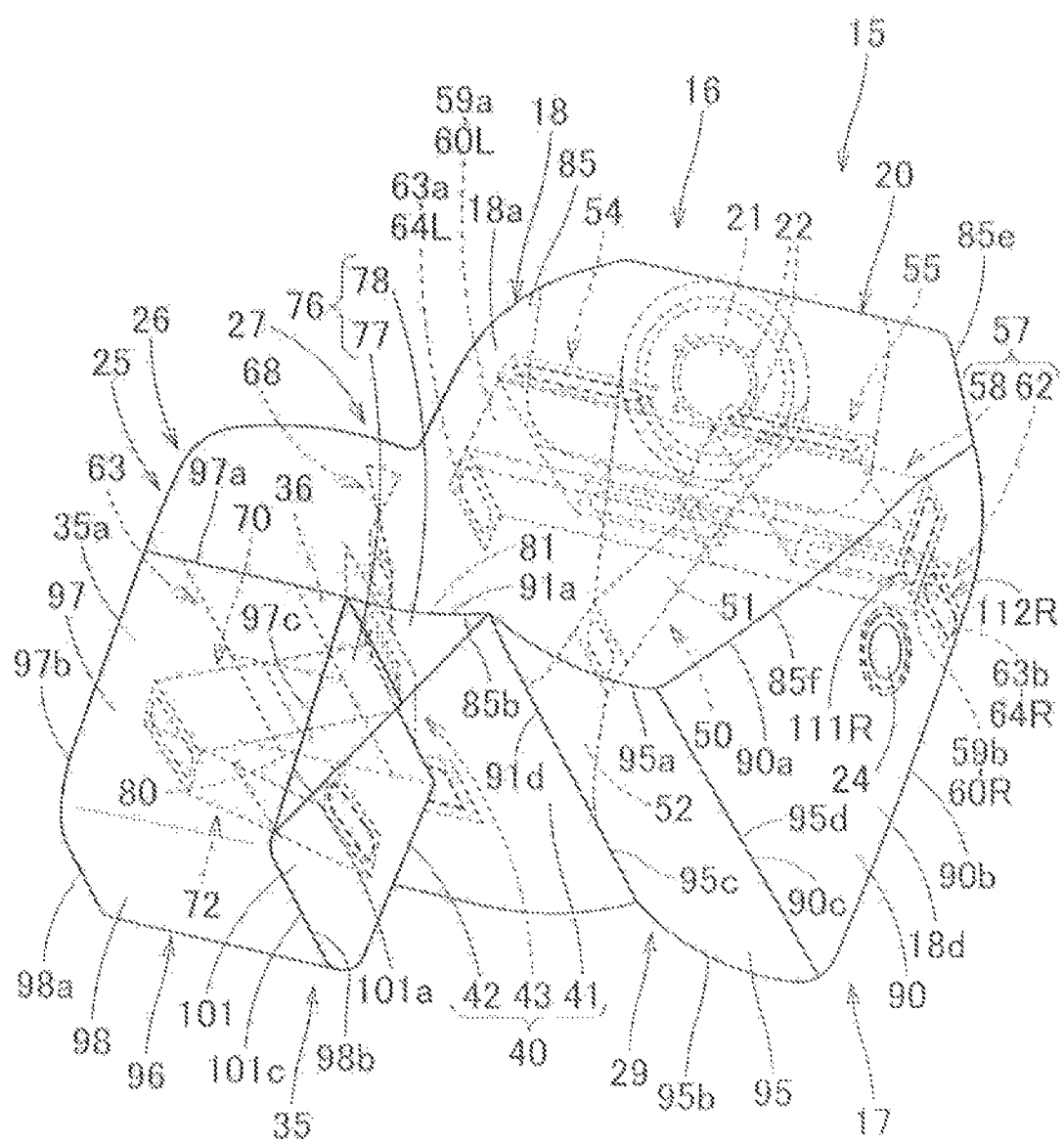
FIG. 4 is a perspective view of the airbag of FIG. 3 as inflated by itself, viewed from right rear above.

The main inflatable section 17 is designed to be so deployed as to fill up a space between the top plane 2 of the dashboard 1 and the windshield 4, as indicated with double-dotted lines in FIG. 1. More specifically, as shown in FIGS. 3 and 4, the outer contour of the main inflatable section 17 as fully inflated is a generally triangular prism extending in a left and right direction. The main inflatable section 17 includes a mounting region 20 at the right front end region as deployed, at which the main inflatable section 17 is mounted on the case 12. That is, the main inflatable section 17 is designed to protrude considerably towards the left (i.e. towards the driver's seat DS or towards the center in a width direction of the vehicle V) at airbag deployment. The main inflatable section 17 includes a rear side wall 29 deployable at the rear to face a front seat passenger MP and a circumferential wall 18 which extends forward from the peripheral edge of the rear side wall 29 while narrowing forward in dimension in an up and down direction.

Figure 10:
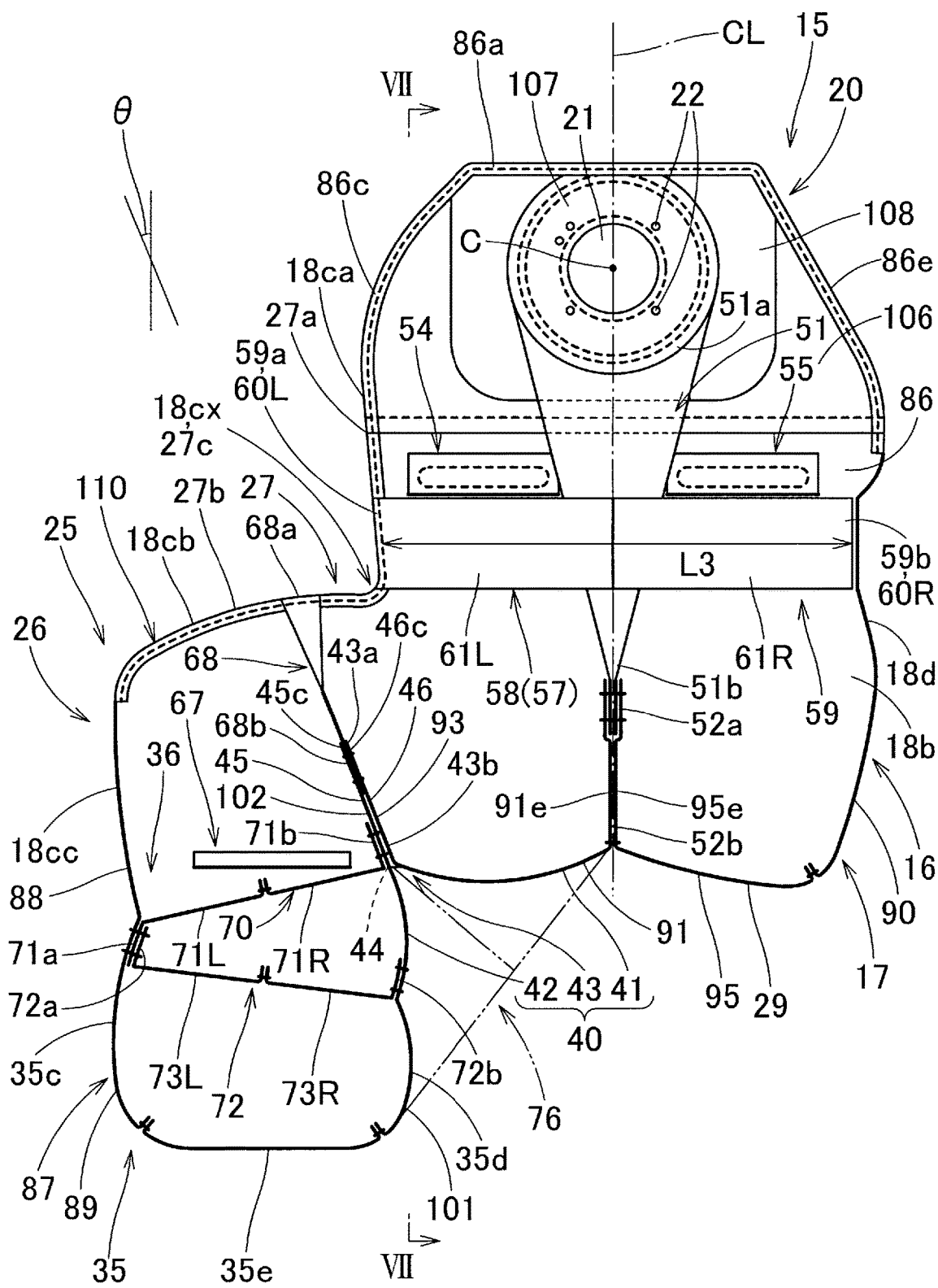
FIG. 10 is a schematic horizontal sectional view of the airbag of FIG. 3.

The circumferential wall 18 is a portion deployable mainly in such a manner as to fill up the space between the top plane 2 of the dashboard 1 and the windshield 4, and includes an upper wall 18a and a lower wall 18b deployable in such a manner as to extend generally along a left and right direction and be opposed to each other, and a left side wall 18c and a right side wall 18d deployable in an opposing fashion. The right side wall 18d is deployable generally along a front and rear direction. The left side wall 18c constitutes the left side of the left region 25. As shown in FIGS. 3 and 10, the left side wall 18c includes a front region 18ca which extends generally along a front and rear direction at the front end, a rear region 18cc which extends generally along a front and rear direction at a further leftward position than the front region 18ca at the rear end, and an intermediate region 18cb which extends generally along a left and right direction and an up and down direction in such a manner as to connect the front region 18ca and rear region 18cc.

Figure 18:
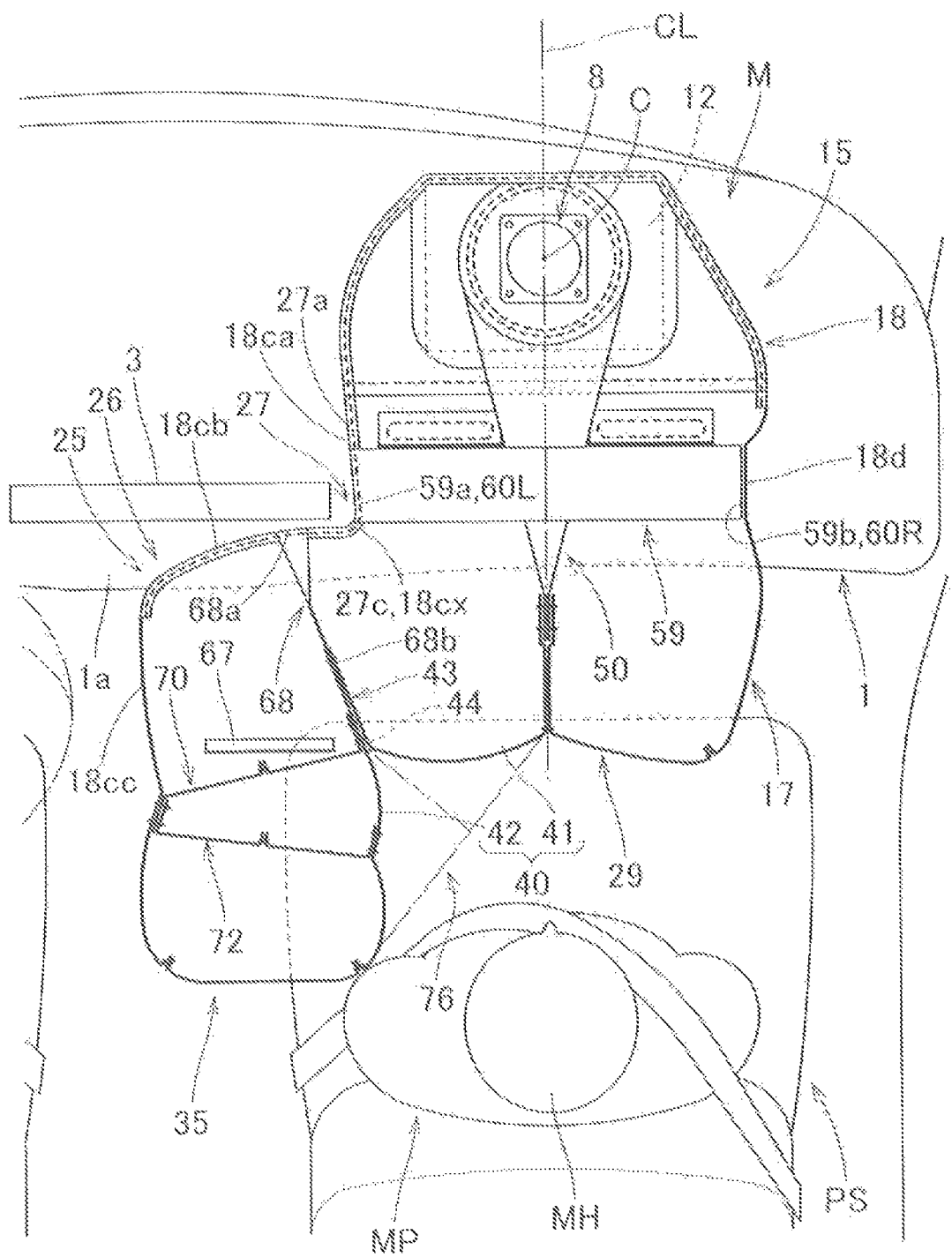
FIG. 18 is a schematic horizontal sectional view of the airbag device of the embodiment as the airbag is completely deployed.

In the airbag 15 of the illustrated embodiment, the right front end region of the circumferential wall 18 at airbag deployment serves as a mounting region 20 at which the airbag 15 is mounted on the case 12 (FIGS. 3, 4 and 10). The mounting region 20 is designed to stay inside the case 12 at airbag deployment. The mounting region 20 is provided, at its lower portion (i.e. on the lower wall 18b), with a generally round gas inlet port 21 for introducing an inflation gas. In the periphery of the gas inlet port 21 are a plurality of (four, in the illustrated embodiment) mounting holes 22 for receiving the bolts 9a of the retainer 9 which secure the periphery of the gas inlet port 21 to the bottom wall 12a of the case 12. In the illustrated embodiment, the main bag section 17 of the airbag 15 is secured to the case 12 and mounted on the vehicle V such that the center (FIG. 10) of the gas inlet port 21 coincides with the center in a left and right direction of the front passenger seat PS, as shown in FIG. 18. The center of the gas inlet port 21 will be called hereinafter a mounting center C, and a line which runs through the mounting center C in a front and rear direction will be called hereinafter a center line CL. As shown in FIGS. 3 and 4, each of the left side wall 18c and right side wall 18d of the circumferential wall 18 is provided with a vent hole 24 for releasing an extra inflation gas. The vent hole 24 of the left side wall 18c is disposed on the rear region 18cc which constitutes a later-described supporting inflatable section 26, as shown in FIG. 3.

As shown in FIG. 10, the main inflatable section 17 of the illustrated embodiment is so designed as to protrude farther leftward (i.e. towards the center in the width direction of the vehicle V or towards the driver's seat DS) than rightward (i.e. towards an outboard direction). More particularly, a leftward protruding amount of the region disposed on the left side of the center line CL (i.e. the supporting inflatable section 26) at airbag deployment is greater than a rightward protruding amount of the region disposed on the right side of the center line CL. As described above, the left region 25 of the main inflatable section 17 protruding considerably leftward constitutes the auxiliary inflatable section. As shown in FIGS. 3, 4 and 10, in order to circumvent the above-described monitor 3 of the car navigation system when deployed, the main inflatable section 17 of the illustrated embodiment is configured to be recessed at the left front portion (at the front end of the left region 25). That is, in the bag body 16 of the illustrated embodiment, the left region 25 serving as the auxiliary inflatable section acts as a supporting inflatable section 26 which is disposed in front of the protruding inflatable section 35 and supports the front side of the protruding inflatable section 35, and the recessed portion which is disposed at the front end of the supporting inflatable section 26 for circumventing the monitor 3 (i.e. an object which protrudes upward out of the dashboard 1) constitutes a circumventing recess 27. The front portion of the left region 25 (i.e. the supporting inflatable section 26 or the auxiliary inflatable section) is recessed over an entire area in an up and down direction. In other words, as shown in FIG. 3, the circumventing recess 27 is formed over the entire area in an up and down direction of the left region 25 (i.e. the auxiliary inflatable section).

In the illustrated embodiment, as shown in FIGS. 3 and 10, the right side face 27a of the circumventing recess 27 (i.e. the front region 18ca of the left side wall 18c) is generally orthogonal to the rear side face 27b of the circumventing recess 27 (i.e. the intermediate region 18cb of the left side wall 18c) at airbag deployment. Thus the circumventing recess 27 is provided with a corner region 27c between the right side face 27a and rear side face 27b (in other words, an intersecting region 18c x of the front region 18ca and intermediate region 18cb. Further, the left region 25 is designed to be deployed such that the left side wall 18c (specifically, the rear region 18cc or the left wall of the supporting inflatable section 26) is disposed in proximity to an airbag 124 deployed over the steering wheel 120 disposed in front of the driver's seat DS. Moreover, as shown in FIG. 10, the airbag 15 is designed such that the front region 18c a of the left side wall 18c (i.e. the right side face 27a of the circumventing recess 27) is located generally at the same position in a left and right direction as the later-described right wall 35d of the protruding inflatable section 35 at airbag deployment.

Figure 6:
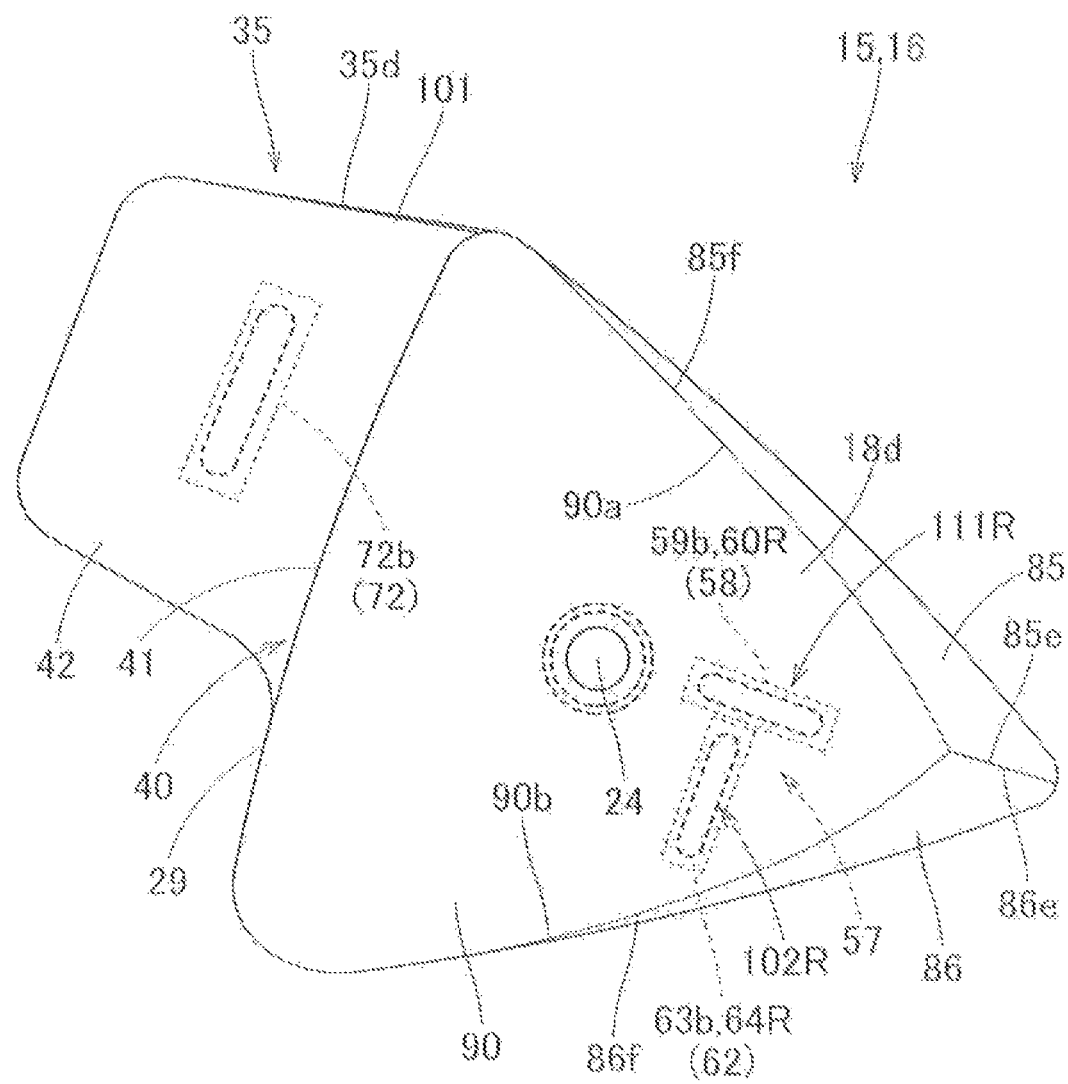
FIG. 6 is a right side view of the airbag of FIG. 3 as inflated by itself.
Figure 7:
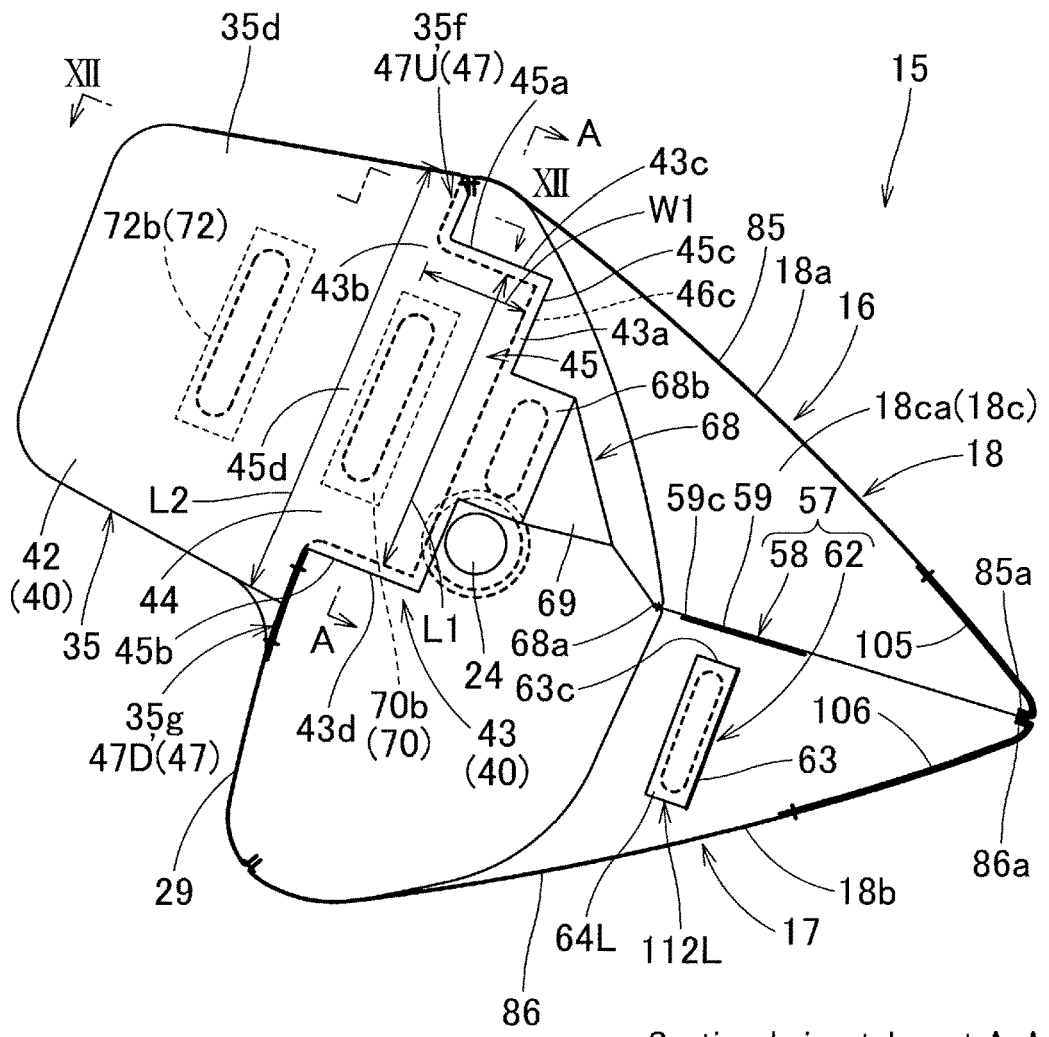
FIG. 7 is a schematic vertical section of the airbag of FIG. 3 taken along line VII-VII of FIG. 10.
Figure 7:
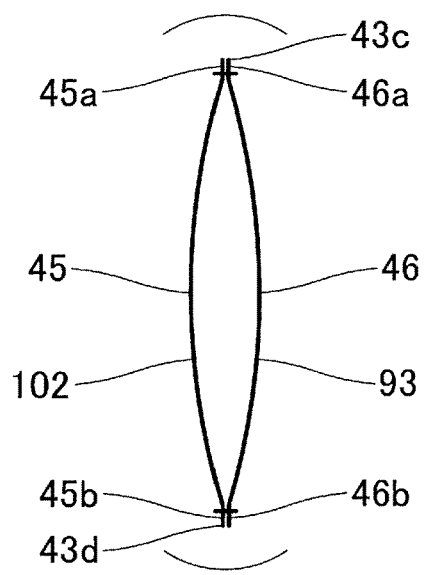
Figure 8:
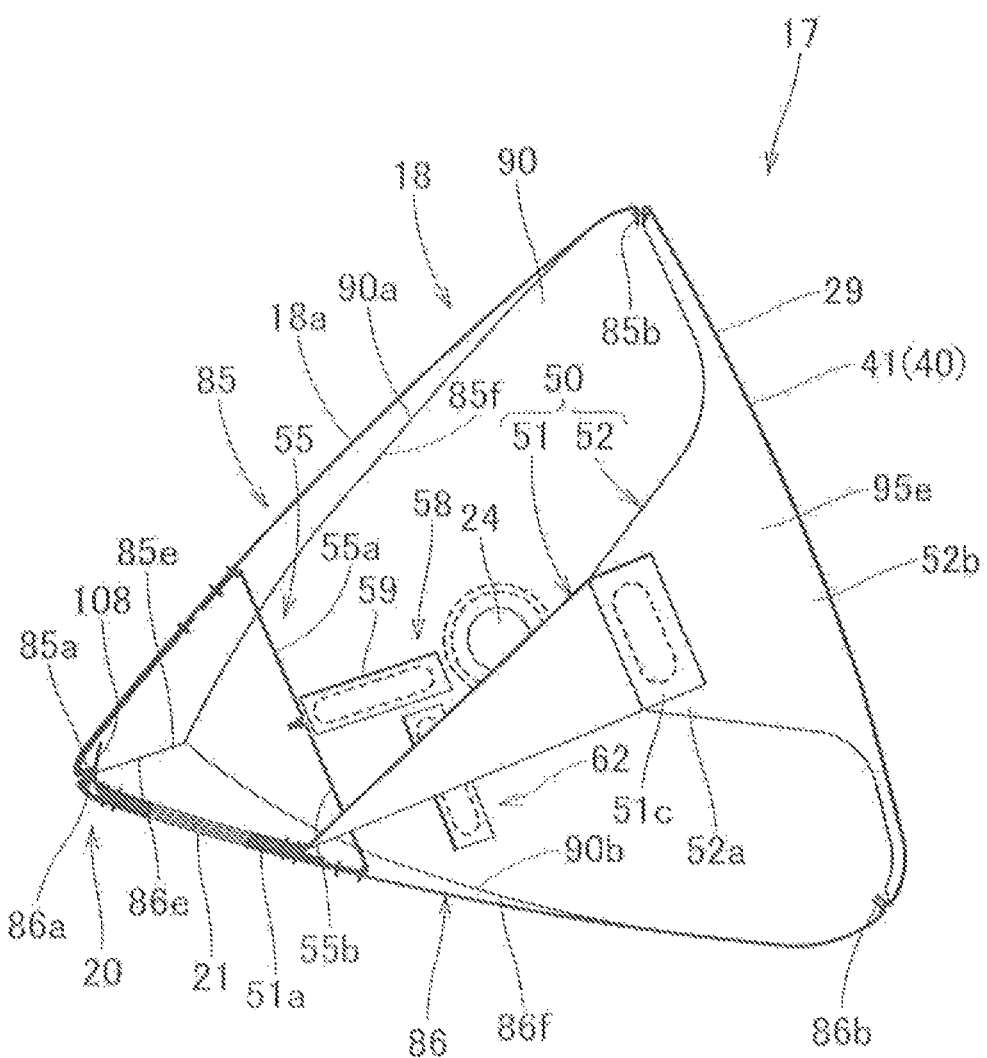
FIG. 8 is a schematic vertical section of the airbag of FIG. 3 taken at the location of a front-rear tether.
Figure 11:
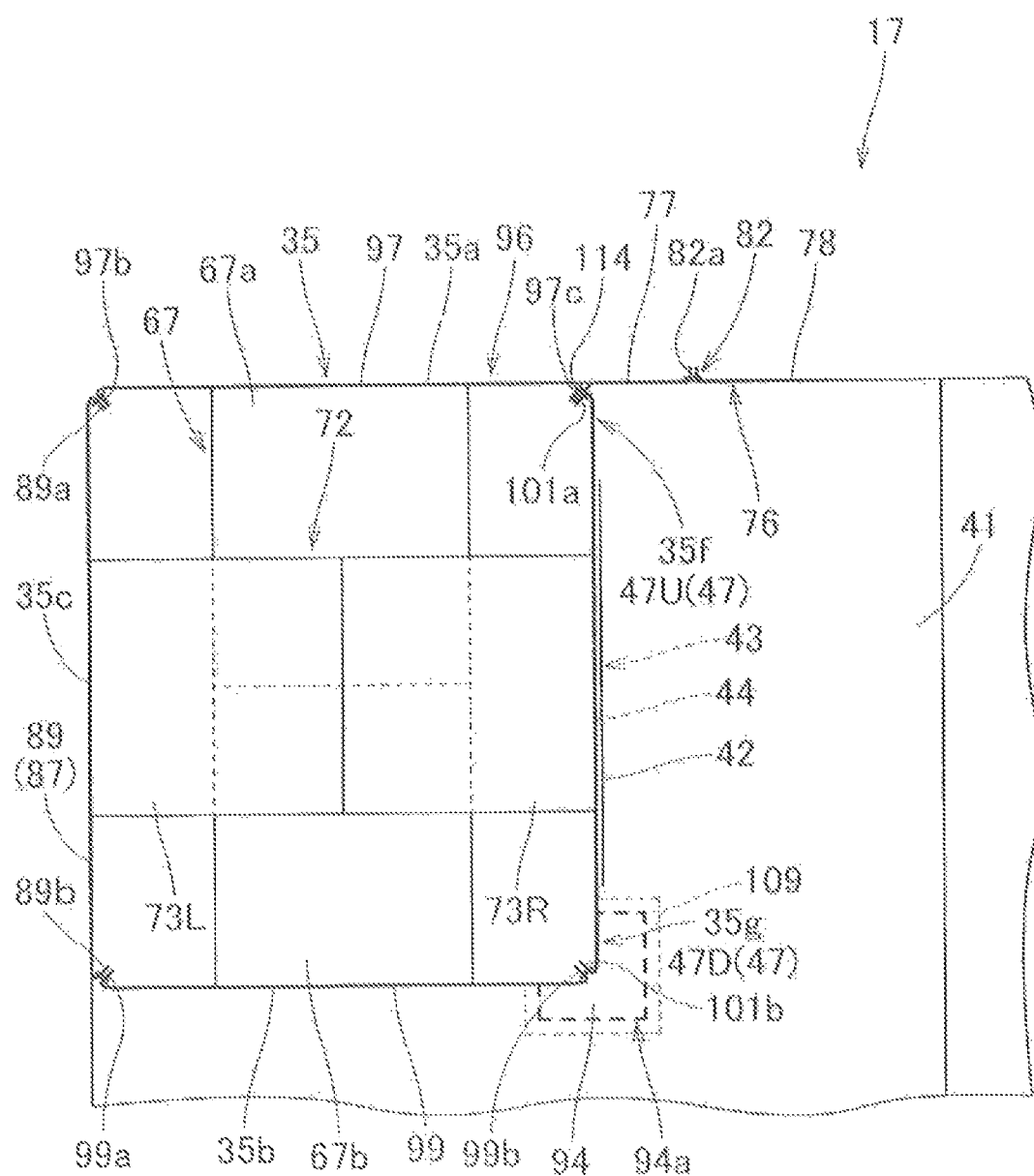
FIG. 11 is a sectional view taken along line XI-XI of FIG. 9.

The rear side wall 29 of the main inflatable section 17 is deployable generally vertically at the rear to face the front passenger seat PS. The rear side wall 29 of the illustrated embodiment is deployable slightly at a slant relative to an up and down direction such that the lower end protrudes farther rearward than the upper end as shown in FIGS. 6 to 8. In a horizontal sectional view of the airbag 15 as deployed, the rear side wall 29 extends generally along a left and right direction, as shown in FIG. 10. As shown in FIG. 11, the protruding inflatable section 35 is located in an area on the left side of the center in a left and right direction of the rear side wall 29 (i.e. on the left side of the center line CL) and at the rear of the left region 25 (i.e. the auxiliary inflatable section). More specifically, the protruding inflatable section 35 is formed at a left upper area of the rear side wall 29 (i.e. at an upper area of the left region 25) as deployed. The protruding inflatable section 35 is thus deployable at an obliquely left front position of the head MH of the passenger MP sitting in the front passenger seat PS, as shown in FIG. 18. The airbag 15 of the illustrated embodiment is designed such that the protruding inflatable section 35 is deployable at the rear of the monitor 3 of the car navigation system. That is, at airbag deployment, the airbag 15 is prevented from being engaged with the monitor 3 by the circumventing recess 27, and the supporting inflatable section 26 and the protruding inflatable section 35 line up in a front and rear direction at the rear of the monitor 3, as shown in FIG. 18.

Figure 12:
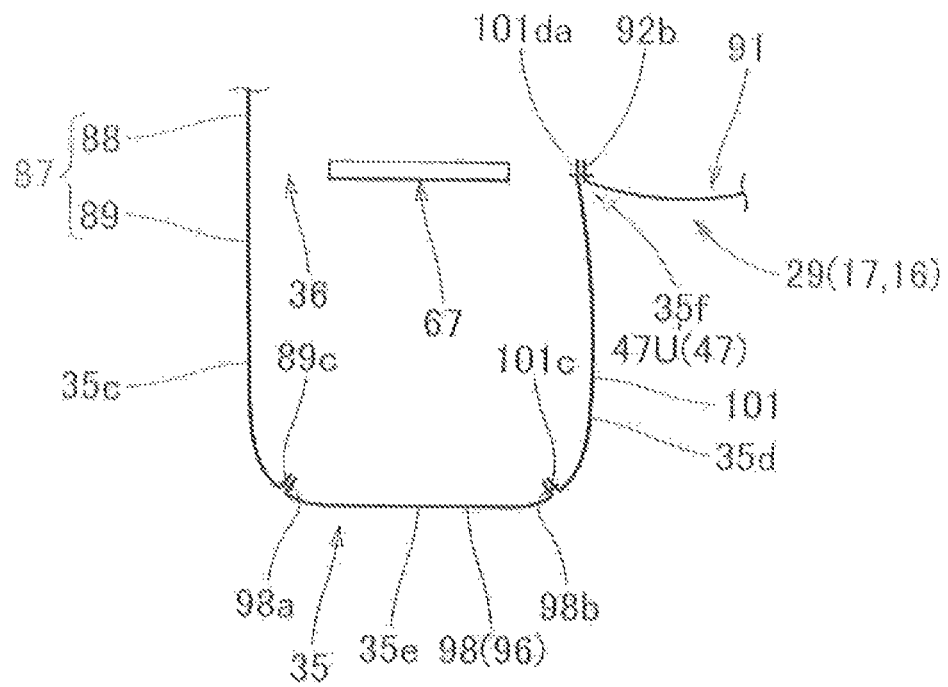
FIG. 12 is a sectional-end view taken along line XII-XII of FIG. 7.

The protruding inflatable section 35 is designed to be deployed in such a manner as to protrude farther rearward than the main inflatable section 17. A communication region 36 is provided at the front end of the protruding inflatable section 35, i.e. between the protruding inflatable section 35 and the supporting inflatable section 26 (i.e., the left region 25 or the auxiliary inflatable section). Thus the protruding inflatable section 35 is fed with an inflation gas from the left region 25 (i.e. the main inflatable section 17) via the communication region 36. The protruding inflatable section 35 includes an upper wall 35a and a lower wall 35b extending generally along a left and right direction on the upper and lower sides, a left side wall 35c and a right side wall 35d extending generally along a front and rear direction at the left and right sides, and a rear side wall 35e extending generally along an up and down direction at the rear. In the illustrated embodiment, the left side wall 35c is continuous with the left side wall 18c of the circumferential wall 18 constituting the left region 25 of the main inflatable section 17 (more particularly, continuous with the rear region 18cc forming the left wall of the supporting inflatable section 26), as shown in FIGS. 10 and 12.

As shown in FIG. 10, in a horizontal sectional view of the airbag 15 as deployed, the protruding inflatable section 35 is formed at an area of the airbag 15 on the left side of the center line CL which runs through the mounting center C in a front and rear direction (in other words, at an area disposed towards the center of the width direction of the vehicle V, or towards the driver's seat DS). In the illustrated embodiment, the width in a left and right direction of the protruding inflatable section 35 as inflated is about two fifths of the width in a left and right direction of a region in a vicinity of the rear side wall 29 of the main inflatable section 17 as inflated. The width in an up and down direction of the protruding inflatable section 35 as inflated is such as to be capable of protecting the head MH of the passenger MP adequately when it moves diagonally left and forward in the event of an oblique collision or an offset collision. More particularly, the width L2 in an up and down direction of the protruding inflatable section 35 is greater than the width L1 (FIG. 7) in an up and down direction of a later-described arresting recess 43, and is about three fifths of the width in an up and down direction of a region in a vicinity of the rear side wall 29 of the main inflatable section 17 as inflated. In the illustrated embodiment, furthermore, as indicated by double-dotted lines in FIG. 2, the protruding inflatable section 35 is designed to protrude farther rearward than the airbag 124 for the steering wheel 120 as deployed at airbag deployment.

In the airbag 15 of the illustrated embodiment, the protruding inflatable section 35 and the rear side wall 29 of the main inflatable section 17 constitute a passenger protection region 40 which protects the passenger MP at airbag deployment. The passenger protection region 40 includes a front-collision arresting face 41 which protects the head MH of the passenger MP when it moves forward in the event of a frontal collision of the vehicle V, and an oblique-collision arresting face 42 which protects the head MH of the passenger MP when it moves diagonally forward in the event of an oblique collision or an offset collision of the vehicle V. There is formed an arresting recess 43 between the front-collision arresting face 41 and the oblique-collision arresting face 42 for receiving and arresting the head MH of the passenger MP.

In the illustrated embodiment, the front-collision arresting face 41 is composed of an upper area of the rear side wall 29, the rear surface of the main inflatable section 17 as deployed. In other words, the front-collision arresting face 41 is composed of an area disposed on the right side of the protruding inflatable section 35 as deployed. That is, the front-collision arresting face 41 includes an area extending farther to the left of the center line CL (towards the driver's seat DS) so as to protect the head MH of the passenger MP smoothly when it moves forward in the event of a frontal collision. As shown in FIG. 10, in the horizontal sectional view of the airbag 15 as deployed, the front-collision arresting face 41 is slightly sunken forward on the center line CL or in a vicinity of the center in a left and right direction.

The oblique-collision arresting face 42 is composed of the right side wall 35*d* of the protruding inflatable section 35 which is continuous with and rises rearward out of the rear side wall 29 of the main inflatable section 17. The oblique-collision arresting face 42 of the illustrated embodiment is designed to be generally orthogonal to the front-collision arresting face 41 and to extend generally along a front and rear direction at airbag deployment. The lower region of the rear side wall 29 of the airbag 15 is to catch mainly the thorax of the passenger MP when the passenger protection region 40 arrests the head MH of the passenger MP.

Figure 15:
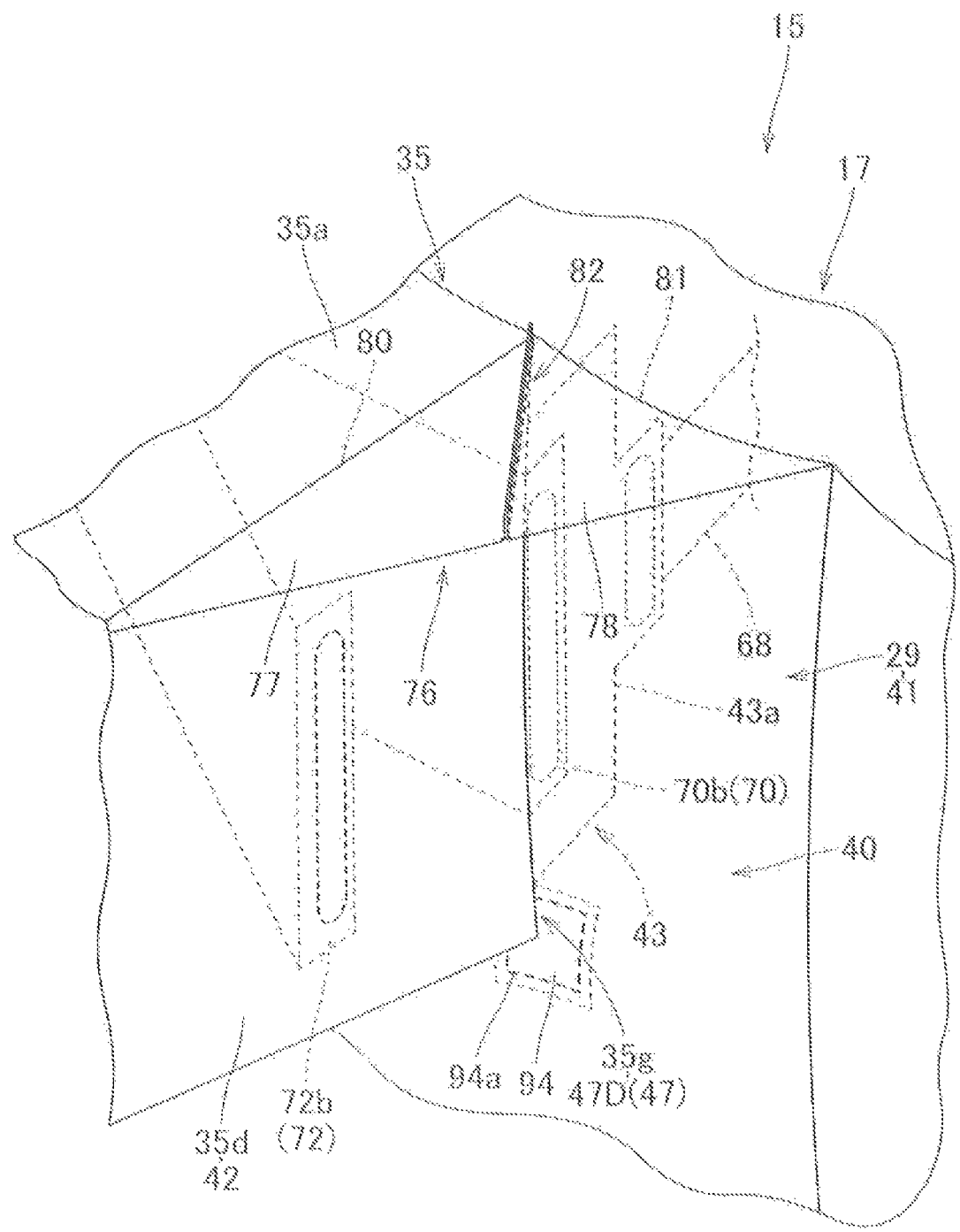
FIG. 15 is a partial enlarged perspective view of the airbag of FIG. 3 especially showing the outer tether.

The arresting recess 43 formed between the front-collision arresting face 41 and oblique-collision arresting face 42 is provided for receiving and arresting the head MH of the passenger MP. In the illustrated embodiment, as shown in FIGS. 10, 11 and 15, the arresting recess 43 is formed generally along an up and down direction at the boundary of the right area of the protruding inflatable section 35 and the rear side wall 29 of the main inflatable section 17, in such a manner as to be sunken or recessed forward like a pocket such that the rear end 43*b* is open, as shown in FIG. 7. In other words, the arresting recess 43 is closed at the upper and lower ends. More specifically, the arresting recess 43 is composed of a left side wall 45 and a right side wall 46 each of which has a generally rectangular contour extending in an up and down direction when viewed from a left and right direction. The arresting recess 43 is formed by jointing (sewing) together upper edges 45*a* and 46*a*, lower edges 45*b* and 46*b* and front edges 45*c* and 46*c* of the left side wall 45 and right side wall 46, thus having a pocket-like shape opening at the rear end 43*b*, as shown in FIG. 7. That is, the arresting recess 43 has a generally uniform width in an up and down direction from the rear end 43*b* to the front end (leading end) 43*a*. The arresting recess 43 has such a width L1 (FIG. 7) in an up and down direction (or a width of the opening 44) as to admit the passenger's head MH smoothly. More specifically, the width L1 in an up and down direction of the arresting recess 43 (i.e. the width of the opening 44) is about 400 mm, which is smaller than the width L2 (FIG. 7) in an up and down direction of the front end region (or root region) of the protruding inflatable section 35. The dimension in a front and rear direction (or depth) W1 (FIG. 7) of the arresting recess 43 is such as to accommodate a front region of the passenger's head MH. The dimension W1 of the illustrated embodiment is about 50 to 100 mm. The arresting recess 43 is so formed that the center in an up and down direction generally coincides with that of the protruding inflatable section 35. In other words, as shown in FIGS. 11, 12 and 15, the protruding inflatable section 35 includes, adjacent the upper edge 43*c* and the lower edge 43*d* of the arresting recess 43, a peripheral region 35*f* and a peripheral region 35*g* which protrude outwardly in an up and down direction and are not recessed. Each of the peripheral regions 35*f* and 35*g* of the protruding inflatable section 35 is jointed to the rear side wall 29 of the main inflatable section 17 at each of the upper side and lower side of the arresting recess 43. Each of the peripheral regions 35*f* and 35*g* serves as a joint region 47U/47D that is formed in a vicinity of the upper end 43*c*/lower end 43*d* of the arresting recess 43 and joints the protruding inflatable section 35 and the rear side wall 29 (i.e. the front-collision arresting face 41 and oblique-collision arresting face 42) together, as shown in FIGS. 11, 12 and 15.

Figure 19:
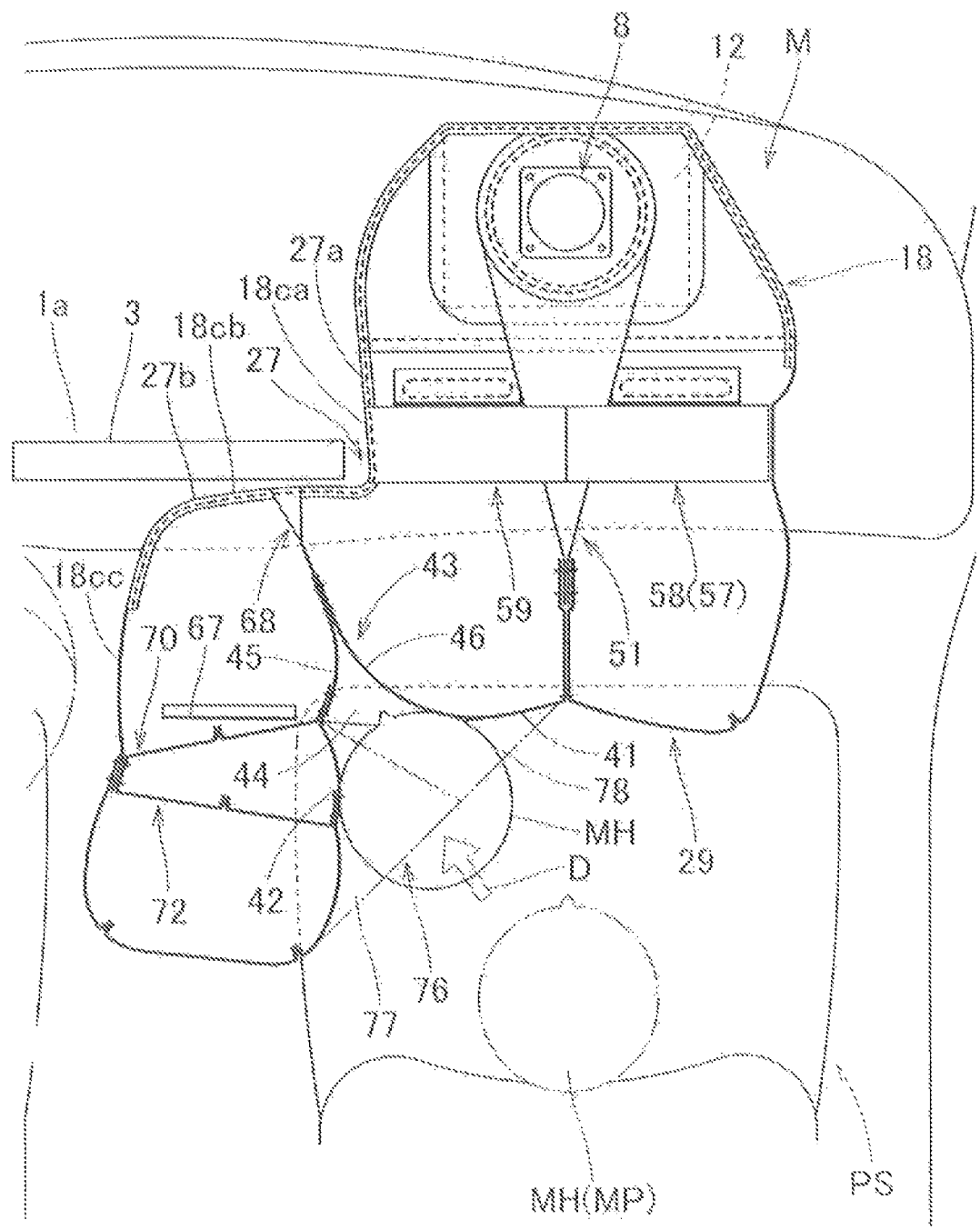
FIG. 19 is a schematic horizontal sectional view of the airbag device showing the way the airbag as deployed catches a diagonally-moving passenger.

In the illustrated embodiment, the airbag 15 is internally provided with a recess-pulling tether 68 which prevents the arresting recess 43 from moving rearward at airbag deployment. The recess-pulling tether 68 also helps deploy the arresting recess 43 generally along a moving direction D (FIG. 19) of the passenger's head MH which moves diagonally forward, as shown in FIGS. 10 and 18. More specifically, the recess-pulling tether 68 helps deploy the arresting recess 43 at a slant with respect to a front and rear direction, with an inclination angle θ (FIG. 10) with respect to the front and rear direction (i.e. with respect to the center line CL running through the mounting center C along a front and rear direction) of about 20 degree (about 15 to 25 degree) such that the arresting recess 43 is deployed generally along the moving direction D of the passenger's head MH which moves diagonally forward. As shown in FIGS. 7 and 15, the recess-pulling tether 68 is jointed to a vicinity of the center in an up and down direction of the leading end (the front end 43*a*) of the arresting recess 43. At airbag deployment, the arresting recess 43 is deployed, pulled by the recess-pulling tether 68, in such a manner as to be continuous with and be sunken forward from the right side wall 35*d* of the protruding inflatable section 35, and such that the left side wall 45 and right side wall 46 are brought into contact with each other generally wholly and thus the rear end 43*b* (or the opening 44) is held from gaping open.

As shown in FIGS. 7 to 12, the bag body 16 internally includes tethers 50, 54, 55, 57, 67, 68, 70 and 72. Specifically, the bag body 16 includes a front-rear tether 50 which is disposed inside the main inflatable section 17, two vertical tethers 54 and 55 which are disposed inside the main inflatable section 17, a left-right tether 57 which is disposed inside the main inflatable section 17, a regulating tether 67 which is disposed in a vicinity of the communication region 36 at the front end of the protruding inflatable section 35, the recess-pulling tether 68 which is disposed inside the left region 25 (auxiliary inflatable section) of the main inflatable section 17 for pulling the arresting recess 43, as described above, and two left-right tethers 70 and 72 which are disposed inside the protruding inflatable section 35.

As shown in FIG. 10, the front-rear tether 50 is designed to be deployed on the center line CL which passes through the center (mounting center C) of the gas inlet port 21 and extends along a front and rear direction, and is formed by jointing a front section 51 extending from the periphery of the gas inlet port 21 and a rear section 52 extending from the rear side wall 29 (FIGS. 8 and 10).

Figure 16:
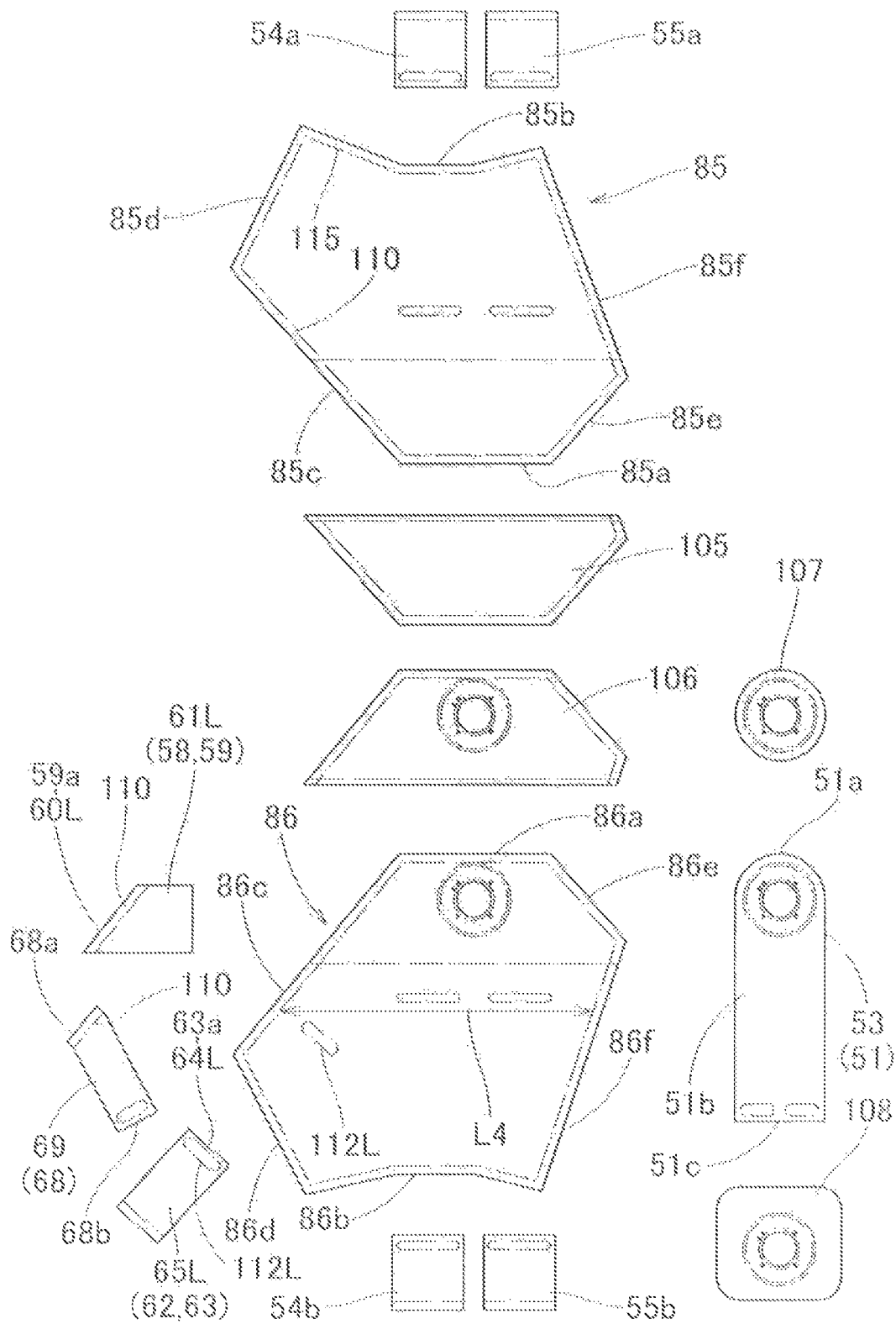
FIGS. 16 and 17 depict base cloths of the airbag of FIG. 3 by plan views.

The front section 51 is formed by folding a base material 53 shown in FIG. 16 into a bilaterally symmetric shape deployable in such a three dimensional shape approximate to a generally triangular pyramid that the front end extends generally in a left and right direction and the rear end extends generally in an up and down direction. As shown in FIG. 10, in the illustrated embodiment, the front end region of the front section 51 serves as a joint region 51a to the bag body 16. The joint region 51a is provided with openings (reference numeral omitted) correspondent to the gas inlet port 21 and mounting holes 22 and is sewn to the periphery of the gas inlet port 21 at the lower portion of the mounting region 20 of the main inflatable section 17 by the entire periphery. The region of the front section 51 extending rearward from the gas inlet port 21 is a main region 51b which forms the three dimensional shape approximate to a generally triangular pyramid (FIGS. 8 and 10). The main region 51b is sewn to the front end 52a of the rear section 52 by the rear end 51c, and a dimension in an up and down direction of the rear end 51c is generally identical to that of the front end 52a of the rear section 52.

Figure 17:
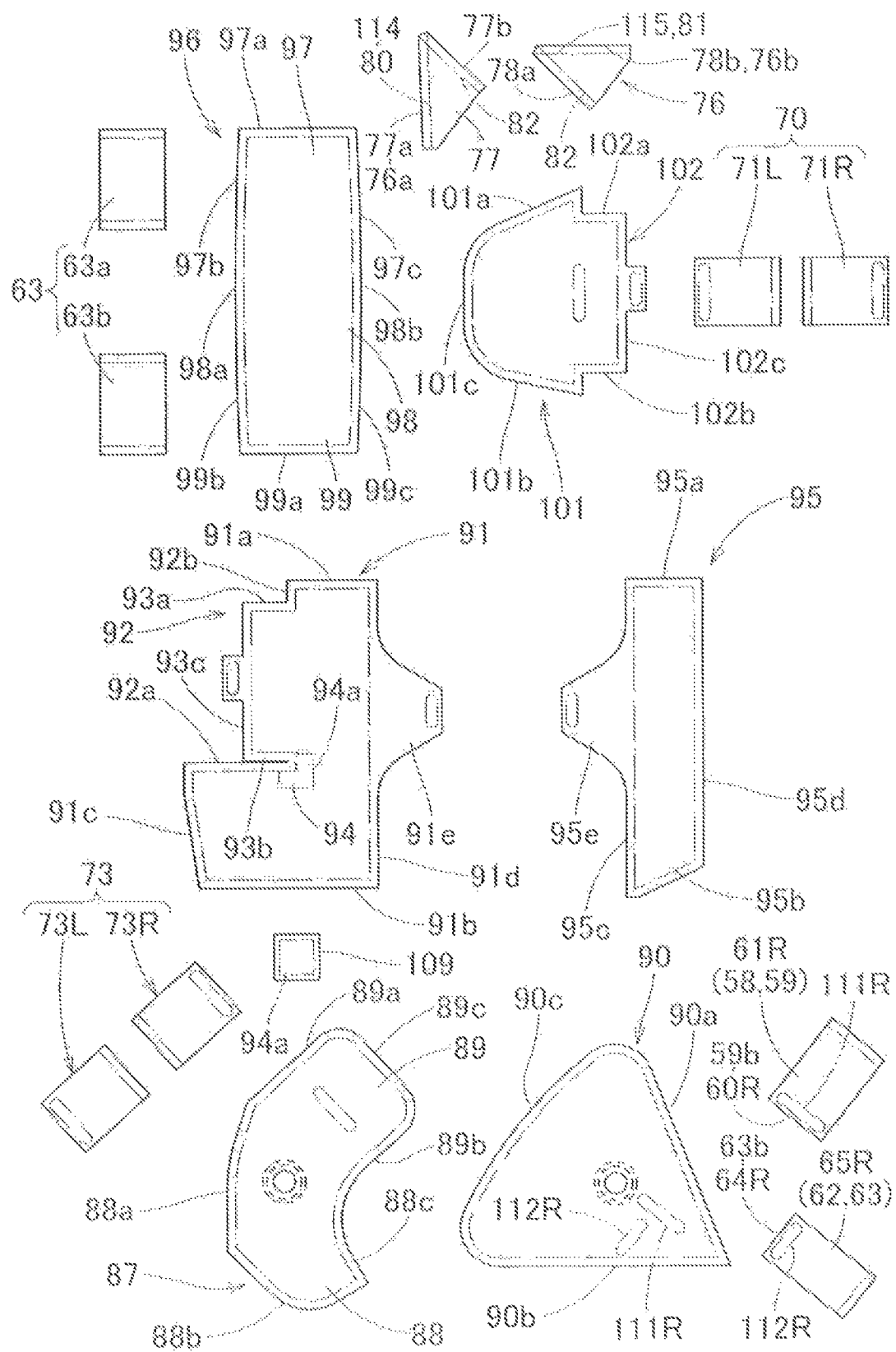

The rear section 52 is in a sheet shape, and is composed of later-described extended regions 91e and 95e each of which is integral with later-described rear left panel 91/rear right panel 95, which form the rear side wall 29 of the main inflatable section 17, and extends from an inner circumferential edge (right edge 91d/ left edge 95c) of the rear left panel 91/rear right panel 95 (FIG. 17). In other words, the rear section 52 has a double-wall structure and is integral with the rear left panel 91 and rear right panel 95. More specifically, the rear section 52 is formed into such a generally trapezoid that enlarges toward the rear end 52b in an up and down direction from the front end 52a jointed to the front section 51.

The front-rear tether 50 is provided for limiting a clearance between the periphery of the gas inlet port 21 and a general center in a left and right direction of the rear side wall 29 at airbag deployment in order to prevent the rear side wall 29 from protruding unduly rearward toward the passenger MP in an initial stage of airbag deployment. As shown in FIG. 10, at airbag deployment, the front-rear tether 50 pulls and deploys the rear side wall 29 such that a region on the center line CL which passes through the mounting center C in a front and rear direction is slightly recessed forward over a generally entire area in an up and down direction. Moreover, the front-rear tether 50 of the illustrated embodiment is disposed to pass through a void space formed between a later-described horizontal band 58 and a vertical band 62 of the left-right tether 57 by the front section 51.

As shown in FIG. 10, two vertical tethers 54 and 55 are disposed side by side in a left and right direction at the same position in a front and rear direction inside the main inflatable section 17. In the illustrated embodiment, the vertical tethers 54 and 55 are located at the rear of the mounting region 20 of the main inflatable section 17 and in front of the left-right tether 57. Further, the vertical tethers 54 and 55 are located on the left and right sides of the front-rear tether 50. Each of the vertical tethers 54 and 55 is formed by joining together a pair of base cloths 54a and 54b/55a and 55b each of which are disposed one above the other, as shown in FIG. 8. In the illustrated embodiment, each of the vertical tethers 54 and 55 is disposed such that the width direction extends generally along a left and right direction, and the tethers 54 and 55 are generally identical in width in a left and right direction. The vertical tethers 54 and 55 limit the clearance between the upper wall 18a and lower wall 18b of the main inflatable section 17 for regulating the outer contour of the main inflatable section 17 as deployed.

The left-right tether 57 is provided for regulating the outer contour of a region in a vicinity of the circumventing recess 27 as deployed. As shown in FIGS. 3 and 4, the left-right tether 57 is disposed generally along a left and right direction and connects the front region 18ca of the left side wall 18c (i.e. the right side face 27a of the circumventing recess 27) and the right side wall 18d. The left-right tether 57 of the illustrated embodiment is composed of a horizontal band 58 which is so deployable that the width direction extends along a front and rear direction and a vertical band 62 which is so deployable that the width direction extends along an up and down direction. More specifically, the horizontal band 58 is disposed generally at the center in an up and down direction of the main inflatable section 17, and the vertical band 62 is disposed below the horizontal band 58 (specifically, between the horizontal band 58 and the lower wall 18b). As shown in FIGS. 7 and 8, in the illustrated embodiment, the upper edge 63c of a later-described main body 63 of the vertical band 62 is located in a vicinity of and slightly forward of the rear edge 59c of a later-described main body 59 of the horizontal band 58. Thus the horizontal band 58 and vertical band 62 of the left-right tether 57 are generally orthogonal to each other and form a generally inverse L shape as viewed from a left and right direction. As shown in FIGS. 3 and 10, each of the horizontal band 58 and vertical band 62 is formed by joining together a pair of base cloths 61L and 61R/65L and 65R each of which are disposed side by side in a left and right direction.

To describe more specifically, the horizontal band 58 includes a generally band-shaped main body 59 which is disposed in such a manner that the width direction extends generally along a front and rear direction, a mounting portion 60L which mounts the left end 59a of the main body 59 to the front region 18ca of the left side wall 18c and a mounting portion 60R which mounts the right end 59b of the main body 59 to the right side wall 18d. The mounting portion 60L is jointed or sewn to the front region 18ca of the left side wall 18c by being sewn up all over with a seam 110 which sews the left front edges 85c and 86c of later-described upper panel 85 and lower panel 86 together, as shown in FIG. 10. The mounting portion 60R extends downward from the main body 59 and is jointed to the right side wall 18d by being jointed or sewn to a later-described right panel 90 over the generally entire area in a front and rear direction with a seam 111R, as shown in FIG. 8. The vertical band 62 includes a generally band-shaped main body 63 which is disposed in such a manner that the width direction extends generally along an up and down direction, a mounting portion 64L which mounts the left end 63a of the main body 63 to the front region 18ca of the left side wall 18c and a mounting portion 64R which mounts the right end 63b of the main body 63 to the right side wall 18d. Each of the mounting portions 64L and 64R extends rearward from the main body 63. The mounting portion 64L is jointed to the front region 18ca of the left side wall 18c by being jointed or sewn to a later-described main portion 88 of a left panel 87 over the generally entire area in an up and down direction with a seam 112L, and the mounting portion 64R is jointed to the right side wall 18d by being jointed or sewn to the right panel 90 over the generally entire area in an up and down direction with a seam 112R.

In the illustrated embodiment, the main body 59 of the horizontal band 58 and the main body 63 of the vertical band 62 have an identical length L3 (FIG. 11), which specifically refers to the sum of lengths of the base cloths 61L and 61R or 65L and 65R in an unfolded state. The length L3 is smaller than the width L4 (FIG. 16) in a left and right direction of the front end region of the upper panel 85 or lower panel 86 of the main inflatable section 17 in an unfolded state. The length L3 is such a length that is capable of forming the circumventing recess 27 in front of the left region 25 (i.e. auxiliary inflatable section) in order for the airbag 15 to circumvent and avoid an engagement with the monitor 3 of the car navigation system at airbag deployment. The left-right tether 57 limits the clearance between the front region 18ca of the left side wall 18c and the right side wall 18d of the main inflatable section 17 and prevent the front region 18ca of the left side wall 18c from protruding towards the left, thus helps form the circumventing recess 27 at airbag deployment. In the illustrated embodiment, being composed of the horizontal band 58 and vertical band 62, the left-right tether 57 helps prevent an extended area of the front region 18ca of the left side wall 18c from protruding towards the left and maintain the circumventing recess 27 in a recessed state adequately. More specifically, the left mounting portion 60L of the horizontal band 58 extends forward from the corner region 27c of the circumventing recess 27, and the left mounting portion 64L of the vertical band 62 extends generally along the corner region 27c of the circumventing recess 27 in a vicinity of the rear edge 59c of the horizontal band 58 (i.e. in a vicinity of the corner region 27c of the circumventing recess 27), as shown in FIG. 3. In other words, the left mounting portion 60L of the horizontal band 58 and the left mounting portion 64L of the vertical band 62 are disposed in a generally inverse L shape in such a manner as to cross each other in a vicinity of the rear edge 59c of the horizontal band 58. Accordingly, the left-right tether 57 pulls the region in a vicinity of the crossing in a planar manner and helps form the corner region 27c in the circumventing recess 27.

Figure 9:
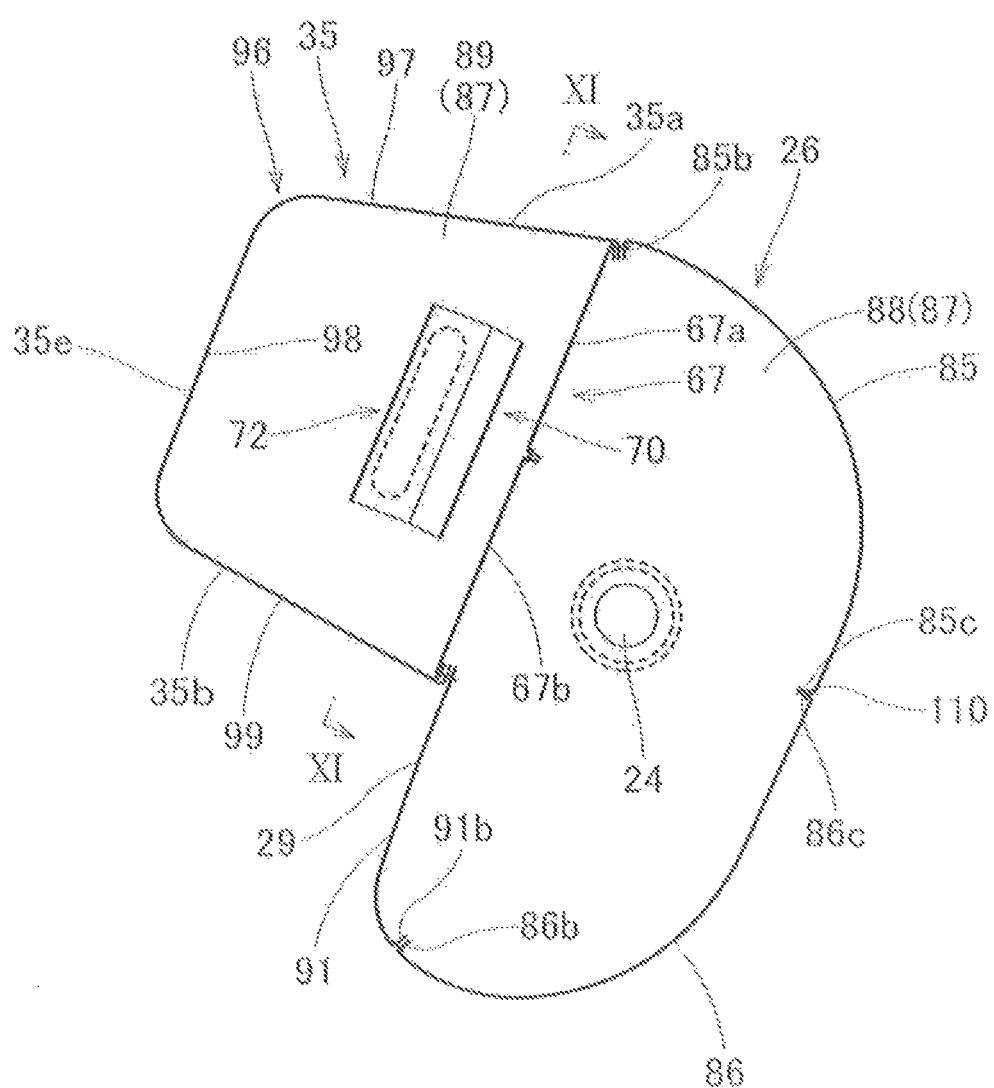
FIG. 9 is a schematic vertical section of the airbag of FIG. 3 taken at the location of a protruding inflatable section.

As shown in FIGS. 9 to 12, the regulating tether 67 is disposed generally along an up and down direction at the location of the communication region 36 of the protruding inflatable section 35, more particularly, at the general center in a left and right direction of the communication region 36. Specifically, the regulating tether 67 connects the upper wall 35a and lower wall 35b of the protruding inflatable section 35 at a vicinity of the front end of the protruding inflatable section 35. The regulating tether 67 is formed generally into a band by joining together a pair of base cloths 67a and 67b which are disposed one above the other, as shown in FIGS. 9 and 11. The regulating tether 67 limits a clearance between the upper wall 35a and lower wall 35b at a vicinity of the boundary of the protruding inflatable section 35 and the main inflatable section 17, i.e. at the vicinity of the communication region 36, in order to regulate the contour of the protruding inflatable section 35 as deployed.

The recess-pulling tether 68, which pulls the arresting recess 43, extends diagonally left and forward from the arresting recess 43 inside the left region 25 (auxiliary inflatable section) of the main inflatable section 17, as shown in FIG. 10. The recess-pulling tether 68 connects the leading end (the front end 43a) of the arresting recess 43 with the rear side of the circumventing recess 27 in the left region 25 (auxiliary inflatable section), i.e. with the intermediate region 18cb of the left side wall 18c, so as to be deployable generally along the moving direction D of the passenger's head MH which moves diagonally forward, as shown in FIG. 10. The recess-pulling tether 68 of the illustrated embodiment extends from a position proximate to the right end of the intermediate region 18cb, which position is in a vicinity of the left end 59a of the horizontal band 58 of the left-right tether 57. More specifically, as described above, the recess-pulling tether 68 and the arresting recess 43 are deployable at a slant with respect to a front and rear direction, with the inclination angle θ (FIG. 10) of about 20 degree (about 15 to 25 degree) with respect to the front and rear direction (with respect to the center line CL passing through the mounting center C along a front and rear direction). The recess-pulling tether 68 of the illustrated embodiment is composed of a band-shaped base cloth 69 (FIG. 16). As shown in FIGS. 3, 4, 7 and 10, the recess-pulling tether 68 is deployable in such a twisted fashion that the rear end 68b jointed to the front end or leading end 43a of the arresting recess 43 is disposed generally along an up and down direction while the front end 68a jointed to the intermediate region 18cb of the left side wall 18c is disposed generally along a left and right direction. In the illustrated embodiment, as shown in FIG. 10, the front end 68a of the recess-pulling tether 68 is sewn together with the left front ends 85c and 86c of the upper panel 85 and lower panel 86 when they are sewn together, at the vicinity of (specifically, on the left side of) the left end 59a of the horizontal band 58 of the left-right tether 57.

The two left-right tethers 70 and 72 are disposed one behind the other inside the protruding inflatable section 35. As shown in FIG. 10, each of the left-right tethers 70 and 72 connects the left side wall 35c and right side wall 35d of the protruding inflatable section 35 and is disposed generally along a left and right direction. The left-right tether 70, which is located on the front side, is deployable at a slant with respect to a left and right direction such that the left end 70a is located farther rearward than the right end 70b, as shown in FIG. 10. Specifically, the right end 70b is jointed to a vicinity of the front end of the right side wall 35d of the protruding inflatable section 35 and in a vicinity of the opening 44 of the arresting recess 43, while the left end 70a is jointed to a position slightly to the front with respect to the center in a front and rear direction of the left side wall 35c of the protruding inflatable section 35. The front left-right tether 70 is located proximate to and at the rear of the regulating tether 67. The rear left-right tether 72 is deployable at a slight slant with respect to a left and right direction such that the right end 72b is located farther rearward than the left end 72a. The right end 72b of the left-right tether 72 is jointed to a generally central position in a front and rear direction of the right side wall 35d of the protruding inflatable section 35, at the rear of the right end 70b of the left-right tether 70. The left end 72a of the left-right tether 72 is jointed to a vicinity of the boundary of the supporting inflatable section 26 and protruding inflatable section 35, together with the left end 70a of the left-right tether 70. In the illustrated embodiment, each of the left-right tethers 70 and 72 is formed by joining together a pair of base cloths 71L and 71R/73L and 73R each of which are disposed side by side in a left and right direction. Since each of the left-right tethers 70 and 72 is so disposed that the width direction extends along an up and down direction, and since the right ends 70b and 72b of the tethers 70 and 72 are jointed to different positions in a front and rear direction of the right side wall 35d of the protruding inflatable section 35, the left-right tethers 70 and 72 control the deployment fashion of a front half area of the right side wall 35d over a broad area in an up and down direction, as shown in FIG. 15, and helps deploy the right side wall 35d (i.e. the oblique-collision arresting face 42) generally along a front and rear direction.

The outer tether 76 is provided for preventing the protruding inflatable section 35 from moving away from the main inflatable section 17 at airbag deployment. The outer tether 76 is disposed outside of the bag body 16. Specifically, as shown in FIGS. 3 and 4, the outer tether 76 connects the upper edge region of the right side wall 35d of the protruding inflatable section 35 and the upper edge region of the rear side wall 29 of the main inflatable section 17.

Figure 13:
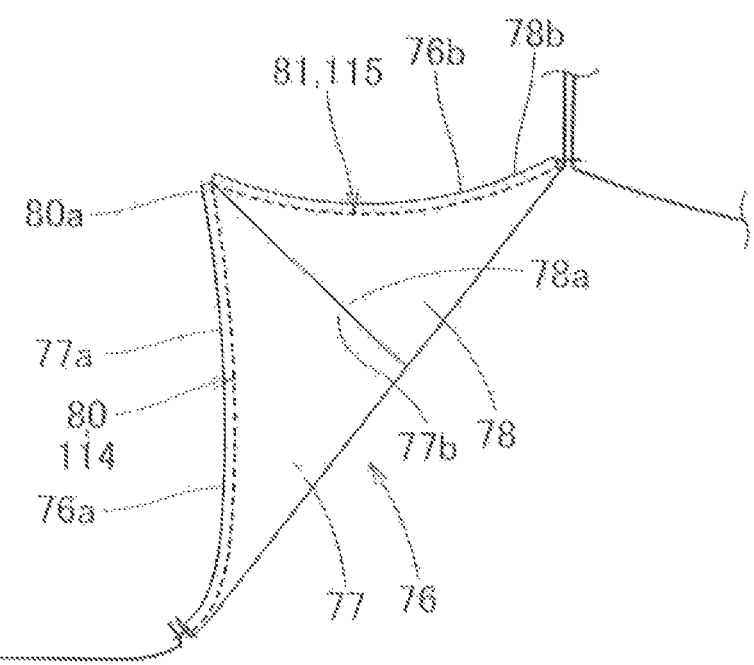
FIG. 13 is a partial enlarged schematic horizontal sectional view of the airbag of FIG. 3 showing the disposition of an outer tether.
Figure 14:
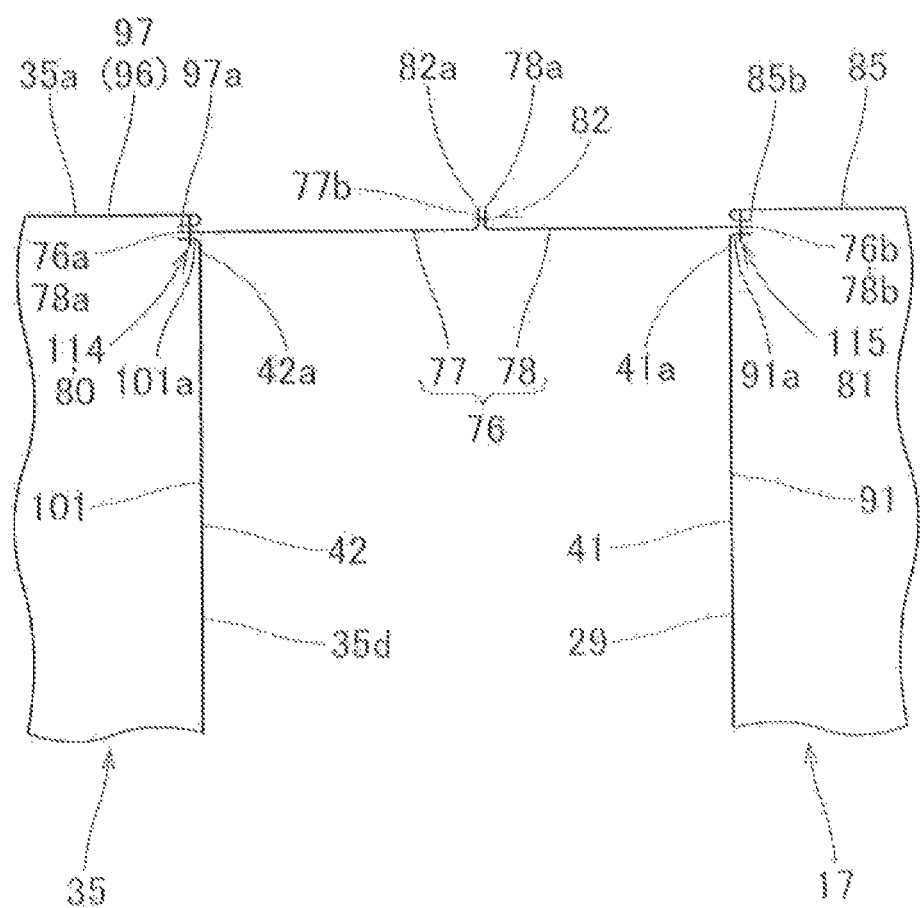
FIG. 14 is a partial enlarged schematic vertical sectional view of the airbag of FIG. 3 showing the disposition of the outer tether.

The outer tether 76 has a generally sectorial contour. More particularly, the outer tether 76 of this specific embodiment is formed into a generally right triangle. The outer tether 76 includes a side edge 76a jointed to the protruding inflatable section 35 and a front edge 76b jointed to the main inflatable section 17. The width in a front and rear direction of the side edge 76a is identical with the width in a front and rear direction of the right side wall 35d of the protruding inflatable section 35, and the width in a left and right direction of the front edge 76b is about a half of the width in a left and right direction of the rear side wall 29 of the main inflatable section 17. The side edge 76a of the outer tether 76 is disposed over a generally entire area in a front and rear direction of the upper edge of the right side wall 35d of the protruding inflatable section 35, which right side wall 35d serves as a near-side wall which faces towards the front-collision arresting face 41 or rear side wall 29. As shown in FIGS. 13 and 14, the side edge 76a is jointed to the upper edge 42a of the oblique-collision arresting face 42 (i.e. of the right side wall 35d) of the protruding inflatable section 35 by a side joint 80, which is formed over a generally entire area in a front and rear direction of the protruding inflatable section 35. The front edge 76b of the outer tether 76 is jointed to the upper edge 41a of the front-collision arresting face 41 (i.e. of the rear side wall 29) of the main inflatable section 17 by a front joint 81. As shown in FIG. 13, the front joint 81 is formed continuously with the front end 80a of the side joint 80, over a generally entire area of the front edge 76b of the outer tether 76. In the illustrated embodiment, the outer tether 76 is composed of two components, i.e. a protruding-side component 77 which forms a portion disposed towards the protruding inflatable section 35 and a main-side component 78 which forms a portion disposed towards the main inflatable section 17. The components 77 and 78 are connected together at the right edge (far-side edge) 77b and left edge (far-side edge) 78a which are located away from the side joint 80 (i.e. the left edge 77a) and front joint 81 (i.e. the front edge 78b). The central joint 82, which connects the right edge 77b and left edge 78a together, has seam allowances 82a on the upper side, as shown in FIG. 14. The outer tether 76 is deployable in a tense fashion, with a tension force generated between the side joint 80 and front joint 81.

In the illustrated embodiment, in a production process of the bag body 16, the side edge 76a of the outer tether 76 (i.e. the left edge 77a of the protruding-side component 77) is sewn together with a seam 114 which sews together the right edge 97c of a later-described upper-wall region 97 of a protruding-section main panel 96 and the upper edge 101a of a later-described protruding-section right panel 101. Thus the side edge 76a of the outer tether 76 is jointed to the upper edge of the right side wall 35d of the protruding inflatable section 35 (i.e. to the upper edge 42a of the oblique-collision arresting face 42) over a generally entire area in a front and rear direction. At this time, the side joint 80 is formed as well. The front edge 76b of the outer tether 76 (i.e. the front edge 78b of the main-side component 78) is sewn together with a seam 115 which sews together the rear edge 85b of a later-described upper panel 85 and the upper edge 91a of a later-described rear left panel 91, thus jointed to the upper edge of a left area of the rear side wall 29 of the main inflatable section 17 (i.e. to the upper edge 41a of a left area of the front-collision arresting face 41) over a generally entire area in a left and right direction. The front joint 81 is formed at this time.

The bag body 16 is formed by sewing together circumferential edges of predetermined shaped base cloths. In the illustrated embodiment, as shown in FIGS. 16 and 17, the bag body 16 is composed of eight base cloths; an upper panel 85 deployable on the upper side, a lower panel 86 deployable on the lower side, a left panel 87 deployable on the left side, a right panel 90 deployable on the right side, a rear left panel 91 and a rear right panel 95 which are deployable on the rear side, a protruding-section main panel 96 which constitutes the upper region, the rear region and the lower region of the protruding inflatable section 35, a protruding-section right panel 101 which constitutes the right region of the protruding inflatable section 35, and additionally, two pieces of reinforcing cloths 105 and 106 for reinforcing the mounting region 20 of the bag body 16, a reinforcing cloth 107 for reinforcing the periphery of the gas inlet port 21, a protecting cloth 108 for protecting the periphery of the gas inlet port 21, and a reinforcing patch 109 for reinforcing an area in a vicinity of the boundary of the protruding inflatable section 35 and main inflatable section 17.

Figure 5:
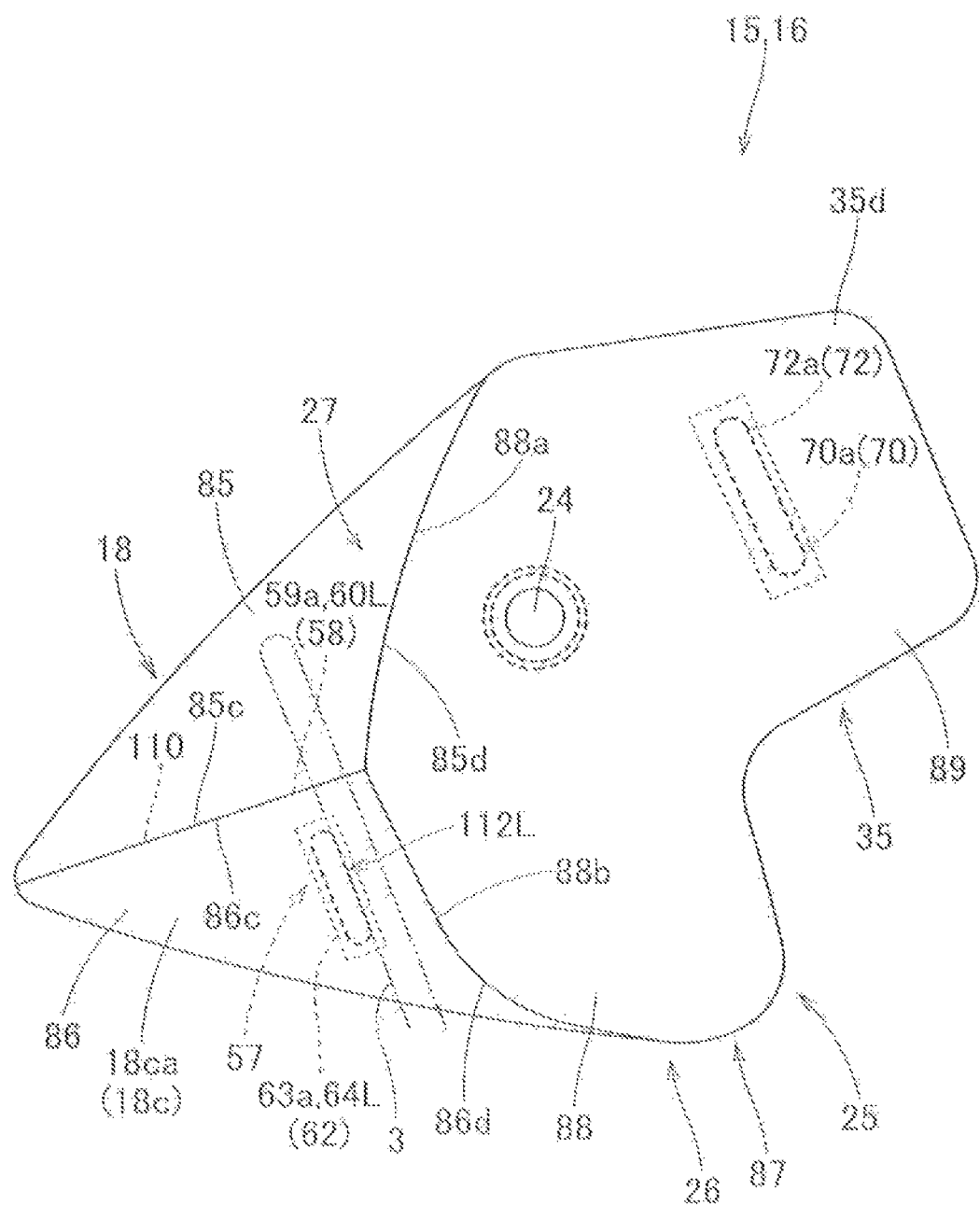
FIG. 5 is a left side view of the airbag of FIG. 3 as inflated by itself.

The upper panel 85 constitutes the upper wall 18a of the main inflatable section 17 and upper areas of the front region 18ca and intermediate region 18cb of the left side wall 18c. The lower panel 86 constitutes the lower wall 18b of the main inflatable section 17 and lower areas of the front region 18ca and intermediate region 18cb of the left side wall 18c. That is, the front region 18ca of the left side wall 18c which constitutes the right side face 27a of the circumventing recess 27 and the intermediate region 18cb of the left side wall 18c which constitutes the rear side face 27b of the circumventing recess 27 are composed of left front areas of the upper panel 85 and lower panel 86. The seam 110 which sews the left front edges 85c and 86c of the upper panel 85 and lower panel 86 together extends generally horizontally at a general center in an up and down direction of the right side face 27a and rear side face 27b of the circumventing recess 27, as shown in FIGS. 3 and 5. The seam 110 also sews the front end 68a of the recess-pulling tether 68 and the left end 59a of the horizontal band 58 of the left-right tether 57 together.

The left panel 87 constitutes the rear region 18cc of the left side wall 18c of the left region or auxiliary inflatable section 25 (i.e. the left side face of the supporting inflatable section 26) as deployed and the left side wall 35c of the protruding inflatable section 35. As shown in FIG. 17, the left panel 87 is formed into such a contour that a generally rectangular protruding region 89 which forms the left side wall 35c of the protruding inflatable section 35 is jointed to the rear upper end of a flat triangular body region 88 which forms the rear region 18cc. The right panel 90 constitutes the right side wall 18d of the main inflatable section 17 as deployed, and is generally triangular in outer contour.

The rear left panel 91 and the rear right panel 95 each form a left half region and a right half region of the rear side wall 29 of the main inflatable section 17 as deployed. In the illustrated embodiment, the rear left panel 91 constitutes a region of the rear side wall 29 which is disposed on the left side of the center line CL running through the mounting center C generally along a front and rear direction, while the rear right panel 95 forms a region of the rear side wall 29 on the right side of the center line CL. The rear left panel 91 has such a contour that the left upper region is cut out for providing gas communication between the main inflatable section 17 and protruding inflatable section 35. As shown in FIG. 17, a flap-like portion 93 is disposed in this cut-out region 92 for forming the right side wall 46 of the arresting recess 43. The flap-like portion 93 is formed into a generally rectangle elongated in an up and down direction and protrudes towards the left out of the right edge 92b of the cut-out region 92 of the rear left panel 91 as developed flatly. More specifically, the width in an up and down direction of the flap-like portion 93 is slightly smaller than that of the cut-out region 92 (i.e., the length of the right edge 92b), and the center in an up and down direction of the flap-like portion 93 is disposed below the center in an up and down direction of the cut-out region 92 such that the lower edge 93b is proximate to the lower edge 92a of the cut-out region 92. Each of the rear left panel 91 and rear right panel 95 is provided, at the inner circumferential edge (i.e. at the right edge 91d/left edge 95c), an extended region 91e/95e for forming the rear section 52 of the front-rear tether 50.

The protruding-section main panel 96 includes an upper-wall region 97 for forming the upper wall 35a, a rear-wall region 98 for forming the rear side wall 35e, and a lower-wall region 99 for forming the lower wall 35b, of the protruding inflatable section 35 as deployed. The protruding-section main panel 96 has such a generally band-shaped outer contour that the upper-wall region 97, the rear-wall region 98 and the lower-wall region 99 are lined up.

The protruding-section right panel 101 forms the right side wall 35d of the protruding inflatable section 35 as deployed, and is formed into a generally trapezoid slightly narrowing towards the rear edge 101c. A flap-like portion 102 for forming the left side wall 45 of the arresting recess 43 is disposed at the front edge 101d of the protruding-section right panel 101. The flap-like portion 102 is formed into a generally rectangle and protrudes out of the front edge 101d of the protruding-section right panel 101. The flap-like portion 102 is generally identical in outer contour to the flap-like portion 93 of the rear left panel 91, as shown in FIG. 17. More specifically, the width in an up and down direction of the flap-like portion 102 is slightly smaller than that of the front edge 101d of the protruding-section right panel 101, and the center in an up and down direction of the flap-like portion 102 generally coincides with the center in an up and down direction of the protruding-section right panel 101. That is, the front edge 101d of the protruding-section right panel 101 includes an upper region 101da and a lower region 101db above and below the flap-like portion 102. In the illustrated embodiment, the upper region 101da is to be jointed with the right edge 92b of the cut-out region 92 of the rear left panel 91, and the lower region 101db is to be jointed to a peripheral region 94 of the rear left panel 91 which is a peripheral region of the corner of the cut-out region 92. As shown in FIGS. 7 and 17, the peripheral region 94 is reinforced with the separate reinforcing patch 109 having a generally rectangular outer contour. The reinforcing patch 109 reinforces a region in a vicinity of the boundary of the main inflatable section 17 (i.e. the supporting inflatable section 26) and the protruding inflatable section 35, in other words, a joint of a region around the right front lower end corner of the protruding inflatable section 35 and the main inflatable section 17 (i.e. the supporting inflatable section 26). In the airbag 15 of the illustrated embodiment, as shown in FIGS. 11, 12 and 15, regions around the joints of the upper region 101da and lower region 101db of the protruding-section right panel 101 to the rear left panel 91 (i.e. regions around peripheral areas 35f and 35g of the protruding inflatable section 35) constitute joint regions 47U and 47D which connect the front-collision arresting face 41 and oblique-collision arresting face 42 at the upper edge 43c and lower edge 43d of the arresting recess 43. More specifically, the lower joint region 47D is formed to ingress the patched area by the reinforcing patch 109 (i.e. to overlap with the seam 94a which sews the reinforcing patch 109 to the peripheral region 94).

The reinforcing cloths 105 and 106 are provided for reinforcing the mounting region 20 of the bag body 16. As shown in FIG. 16, each of the reinforcing cloths 105 and 106 has a generally trapezoidal contour shaped to the front region of each of the upper panel 85 and lower panel 86. The reinforcing cloth 107 for reinforcing the periphery of the gas inlet port 21 has a generally circular shape. The protecting cloth 108, which is generally rectangular in outer contour, is provided for covering the seam formed in the periphery of the gas inlet port 21 (more particularly, the seam (reference numeral omitted) which sews the front edges 85a and 86a of the upper panel 85 and lower panel 86 together) and protecting the seam from inflation gas.

In the illustrated embodiment, components of the bag body 16, i.e., the upper panel 85, lower panel 86, left panel 87, right panel 90, rear left panel 91, rear right panel 95, protruding-section main panel 96, protruding-section right panel 101, reinforcing cloths 105, 106 and 107, protecting cloth 108, reinforcing patch 109, base material 53 of the front section 51 of the front-rear tether 50, base cloths 54a, 54b, 55a and 55b of the vertical tethers 54 and 55, base cloths 61L, 61R, 65L and 65R of the horizontal band 58 and vertical band 62 of the left-right tethers 57, base cloths 67a and 67b for forming the regulating tether 67, base cloth 69 for forming the recess-pulling tether 68, base cloths 71L, 71R, 73L and 73R for forming the left-right tethers 70 and 72, the protruding-side component 77 and main-side component 78 for forming the outer tether 76 are made of a flexible woven fabric of polyester yarn, polyamide yarn or the like.

As shown in FIGS. 3 to 15, the bag body 16 of the illustrated embodiment is formed by sewing (jointing) corresponding circumferential edges of the upper panel 85, lower panel 86, left panel 87, right panel 90, rear left panel 91, rear right panel 95, protruding-section main panel 96, and protruding-section right panel 101 together with sewing threads. More specifically, the front edge 85a, left front edge 85c and right front edge 85e of the upper panel 85 are jointed with the front edge 86a, left front edge 86c and right front edge 86e of the lower panel 86. The rear edge 85b of the upper panel 85 is jointed with the front edge 97a of the upper-wall region 97 of the protruding-section main panel 96, the upper edge 91a of the rear left panel 91 and the upper edge 95a of the rear right panel 95. The seam 115 which sews the rear edge 85b of the upper panel 85 and the upper edge 91a of the rear left panel 91 together also sews the front edge 78b of the main-side component 78 of the outer tether 76 together, and forms the front joint 81 of the outer tether 76 to the main inflatable section 17. The left rear edge 85d of the upper panel 85 is jointed with the upper edge 88a of the body region 88 of the left panel 87. The right rear edge 85f of the upper panel 85 is jointed with the upper edge 90a of the right panel 90. The rear edge 86b of the lower panel 86 is jointed with the lower edges 91b and 95b of the rear left panel 91 and rear right panel 95. The left rear edge 86d of the lower panel 86 is jointed with the lower edge 88b of the body region 88 of the left panel 87. The right rear edge 86f of the lower panel 86 is jointed with the lower edge 90b of the right panel 90. The rear edge 88c of the body region 88 of the left panel 87 is jointed with the left edge 91c of the rear left panel 91. The upper edge 89a of the protruding region 89 of the left panel 87 is jointed with the left edge 97b of the upper-wall region 97 of the protruding-section main panel 96, the rear edge 89c is jointed with the left edge 98a of the rear-wall region 98 of the protruding-section main panel 96, and the lower edge 89b is jointed with the left edge 99b of the lower-wall region 99. The rear edge 90c of the right panel 90 is jointed with the right edge 95d of the rear right panel 95. The right edge or inner circumferential edge 91d of the rear left panel 91 is jointed with the left edge or inner circumferential edge 95c of the rear right panel 95. The lower edge 92a of the cut-out region 92 of the rear left panel 91 is jointed with the front edge 99a of the lower-wall region 99 of the protruding-section main panel 96. The right edge 92b of the cut-out region 92 of the rear left panel 91 is jointed with the upper region 101da of the front edge 101d of the protruding-section right panel 101. The upper edge 93a, lower edge 93b and front edge 93c of the flap-like portion 93 of the rear left panel 91 are each jointed with the upper edge 102a, lower edge 102b and front edge 102c of the flap-like portion 102 of the protruding-section right panel 101. The right edge 97c of the upper-wall region 97, the right edge 98b of the rear-wall region 98 and the right edge 99c of the lower-wall region 99 of the protruding-section main panel 96 are each jointed with the upper edge 101a, rear edge 101c and lower edge 101b of the protruding-section right panel 101. The seam 114 which sews the right edge 97c of the upper-wall region 97 and the upper edge 101a of the protruding-section right panel 101 also sews the left edge 77a of the protruding-side component 77 (i.e. the side edge 76a) of the outer tether 76 together, and forms the side joint 80 of the outer tether 76 to the protruding inflatable section 35. The lower region 101db of the front edge 101d of the protruding-section right panel 101 is jointed to the peripheral region 94 of the rear left panel 91, which is the peripheral region of the corner of the cut-out region 92, as described above.

After forming the bag body 16, when the right edge 77b of the protruding-side component 77 and the left edge 78a of the main-side component 78 are sewn (jointed) together with sewing threads, the outer tether 76 is formed as well as the central joint 82.

Figure 20A:
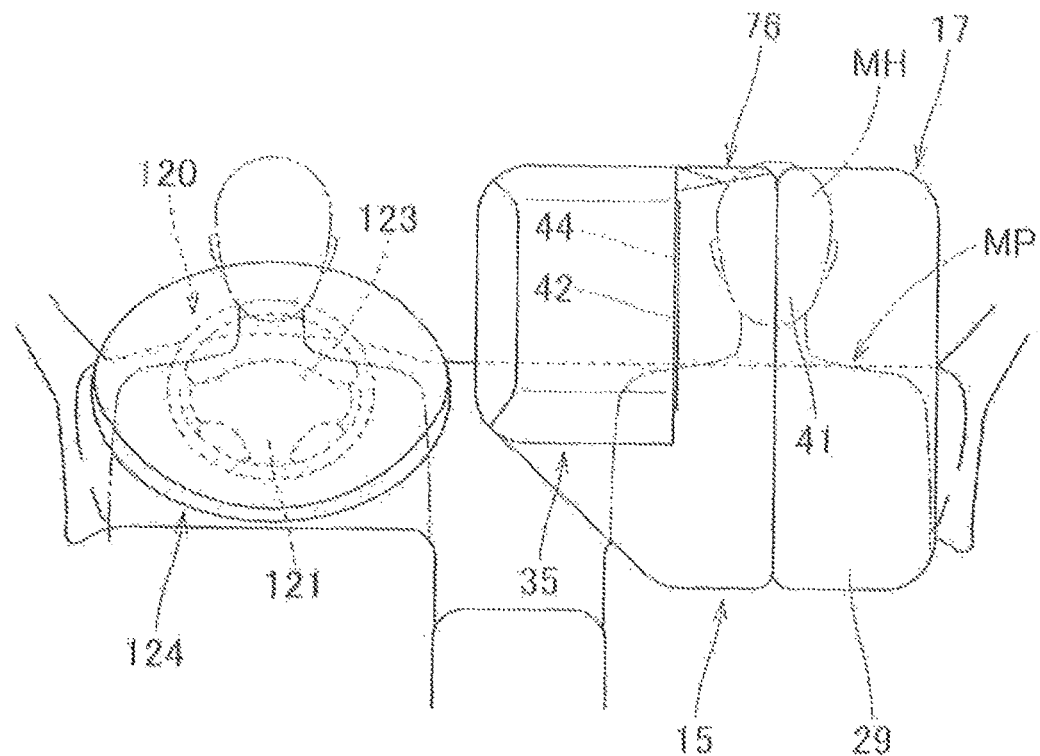
FIG. 20A is a schematic front elevation of the airbag device as has completed airbag deployment before catching a passenger.
Figure 20B:
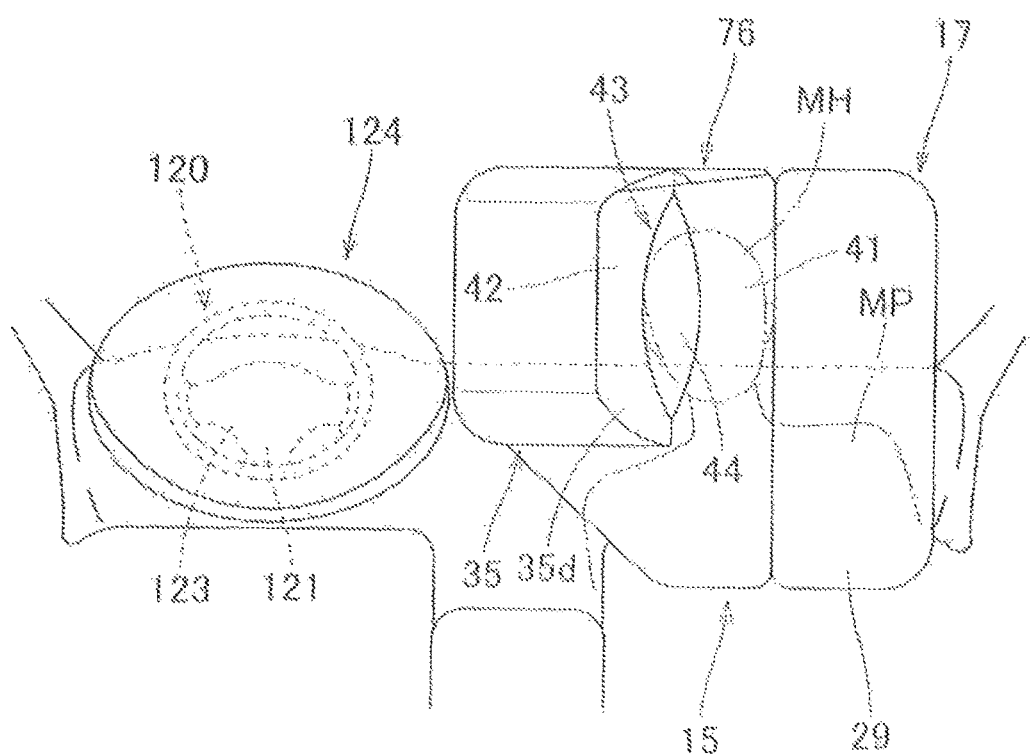
FIG. 20B is a schematic front elevation of the airbag device as has completed deployment and caught the passenger.

The steering wheel 120 located in front of the driver's seat DS, which is on the left of the front passenger seat PS, is provided with an airbag device 123 for a steering wheel. The airbag device 123 includes an airbag 124 for a steering wheel which is stored in a boss section 121 disposed at the center of the steering wheel 120 in an folded-up configuration, and an inflator (not-shown) for feeding the airbag 124 with inflation gas. The airbag 124 is fabricated of a flexible sheet material and inflatable with an inflation gas fed from the inflator to cover the top surface (i.e., rear surface) of the steering wheel 120 entirely (FIGS. 2 and 20). In a similar fashion to the inflator 8 of the airbag device M for a front passenger seat, the inflator of the airbag device 123 for a steering wheel is designed to be actuated in the event of a frontal collision, an oblique collision and an offset collision of the vehicle V.

Mounting of the airbag device M on the vehicle V is now described. Firstly, the retainer 9 is housed inside the airbag 15, and the airbag 15 is folded up to be housed in the case 12. Then a breakable wrapping sheet is wrapped around the airbag 15 for keeping the folded-up configuration. Then the airbag 15 is placed on the bottom wall 12a of the case 12, and the main body 8a of the inflator 8 is set in the case 12 from the lower side of the bottom wall 12a, such that the bolts 9a projecting downwardly from the bottom wall 12a go through the flange 8c of the inflator 8. If then the bolts 9a projecting out of the flange 8c of the inflator 8 are fastened with nuts 10, the airbag 15 and the inflator 8 are mounted on the bottom wall 12a of the case 12.

Thereafter, the circumferential wall 12b of the case 12 is attached to the joint wall 6c of the airbag cover 6 on the dashboard 1, which has been mounted on board in advance, and the unillustrated bracket of the case 12 is secured to the vehicle body structure. Thus the airbag device M is mounted on the vehicle V.

After the airbag device M for a front passenger seat of the illustrated embodiment is mounted on the vehicle V, in the event of a frontal collision, an oblique collision or an offset collision of the vehicle V, the inflator 8 discharges an inflation gas from the gas discharge ports 8b to inflate the airbag 15. Then the airbag 15 pushes and opens the doors 6a and 6b of the airbag cover 6, protrudes out of the case 12 via an opening formed by the opening of the doors 6a and 6b, and is deployed upward and rearward in such a manner as to fill up a space between the top lane 2 of the dashboard 1 and the windshield 4, as indicated by double-dotted lines in FIGS. 1 and 2 and as shown in FIGS. 18 and 20. At the same time, the airbag 124 for the steering wheel is also inflated with an inflation gas and is deployed over the top surface (i.e. rear surface) of the steering wheel 120 (FIG. 20).

In the airbag device M for a front passenger seat in the illustrated embodiment, the airbag 15 includes the outer tether 76 which is disposed on the outside of the bag body 16 for preventing the protruding inflatable section 35 from moving away from the main inflatable section 17 at airbag deployment. The outer tether 76 is formed into a generally sectorial outer contour, and the side edge 76a of the outer tether 76 is jointed to the upper edge region of the protruding inflatable section 35 while the front edge 76b is jointed to the upper edge region of the main inflatable section 17. The side edge 76a is disposed over a generally entire area in a front and rear direction of the upper edge region of the right side wall 35d of the protruding inflatable section 35 and is jointed to the upper edge of the right side wall 35d of the protruding inflatable section 35 (i.e. to the upper edge 42a of the oblique-collision arresting face 42 or near-side wall) all over by the side joint 80. With this configuration, in the event that the head MH of a passenger MP pushes the oblique-collision arresting face 42 diagonally forward forcefully, the outer tether 76 will prevent a part of the protruding inflatable section 35 from moving away from the main inflatable section 17 such that the oblique-collision arresting face 42 can smoothly guide the head MH towards the arresting face 43.

When the head MH of the passenger MP is thus guided into the arresting recess 43 by the oblique-collision arresting face 42, at least a part of the head MH will thrust itself into the arresting recess 43 while opening the recess 43 toward the left and right, such that the head MH will be caught by a large arresting area composed of inner surfaces of the arresting recess 43 (i.e. the left side wall 45 and right side wall 46) on the front, left and right sides. Moreover, since the arresting recess 43 will contact both laterals of the head MH, it will not turn the head MH in a left and right direction when catching the head MH. As a consequence, the airbag device M of the foregoing embodiment will arrest the passenger's head MH smoothly with the arresting recess 43 in the event of an oblique collision or an offset collision. Further, in the airbag device M, the side edge 76*a* of the outer tether 76 is disposed over a generally entire area in a front and rear direction of the upper edge of the near-side wall (i.e. right side wall 35*d*) of the protruding inflatable section 35. With this configuration, in the event that the passenger's head MH pushes the protruding inflatable section 35 toward a direction away from the main inflatable section 17 when guided by the oblique-collision arresting face 42 and going into the arresting recess 43, the outer tether 76 will prevent a rear end portion of the protruding inflatable section 35 from opening towards a direction away from the main inflatable section 17, such that the arresting recess 43 will protect the head MH adequately. Moreover, the outer tether 76 connects the upper edges of the protruding inflatable section 35 and main inflatable section 17, in other words, the outer tether 76 is disposed above the arresting recess 43. With this configuration, the arresting recess 43 will not be affected by the outer tether 76 and will receive the passenger's head MH smoothly. At a frontal collision of the vehicle V, the airbag 15 of the airbag device M will catch the passenger's head MH with the front-collision arresting face 41.

Therefore, the airbag device M for a front passenger seat of the illustrated embodiment is capable of protecting the passenger MP with the airbag 15 smoothly as he moves diagonally forward.

Especially, the airbag 15 of the airbag device M internally includes the recess-pulling tether 68 which connects the leading end (or front end) 43*a* of the arresting recess 43 and the front end portion of the airbag 15 as deployed (i.e. the rear side face 27*b* of the circumventing recess 27). The recess-pulling tether 68 helps keep the arresting recess 43 recessed adequately and prevent the arresting recess 43 from moving or oscillating in a front and rear direction at airbag deployment, thus the arresting recess 43 will be deployed in place quickly. Further, since the recess-pulling tether 68 helps deploy the arresting recess 43 generally along the moving direction D of the head MH of the passenger MP which moves diagonally forward, the head MH will go into the arresting recess 43 generally along the direction that the arresting recess 43 is recessed. That is, the recess-pulling tether 68 will help prevent only either one of the inner surfaces (the left side wall 45 or right side wall 46) from being engaged with the passenger's head MH and enable the arresting recess 43 to catch the head MH in a balanced fashion with the inner surfaces (the left side wall 45 or right side wall 46). As a consequence, the arresting recess 43 will catch the head MH of the passenger MP without turning the head MH in a left and right direction.

In the airbag device M for a front passenger seat of the illustrated embodiment, the front joint 81 of the outer tether 76, which joints the front edge 76*b* of the outer tether 76 to the upper edge region of the main inflatable section 17 (i.e. to the upper edge 41*a* of the front-collision arresting face 41), is continuous with the front end 80*a* of the side joint 80 and is formed generally all over the front edge 76*b* of the outer tether 76. That is, the side edge 76*a* and front edge 76*b* of the outer tether 76 are wholly jointed to the upper edge regions of the protruding inflatable section 35 and main inflatable section 17 above the arresting recess 43 as shown in FIG. 13. This configuration will further adequately help prevent the protruding inflatable section 35 from moving away from the main inflatable section 17 when the passenger's head MH goes into the arresting recess 43. If such an advantageous effect does not have to be considered, the airbag may be configured like a later-described airbag 15B. In the airbag 15B, a front joint 135B which joints the outer tether 130 to the main inflatable section 17 is formed separate from a side joint 134 to the protruding inflatable section 35.

Moreover, the outer tether 76 of the illustrated embodiment is composed of two components; the protruding-side component 77 which is disposed towards the protruding inflatable section 35 and the main-side component 78 which is disposed towards the main inflatable section 17, and the outer tether 76 is formed by jointing together the far-side edge (i.e. right edge 77*b*) of the protruding-side component 77 located away from the side joint 80 and the far-side edge (i.e. left edge 78*a*) of the main-side component 78 located away from the front joint 81. This configuration will facilitate a jointing work of the outer tether to the protruding inflatable section 35 and main inflatable section 17 in the production of the airbag 15 in comparison with an instance where the outer tether is composed of a single piece of sheet material. The above configuration will also enable a fine adjustment of a length of the outer tether 76 (particularly, a distance between the side joint 80 and front joint 81) in the production of the airbag 15 by varying a size of the seam allowance 82*a* of the far-side edges (right edge 77*b* and left edge 78*a*) of the protruding-side component 77 and main-side component 78. If such an advantageous effect does not have to be considered, the outer tether may be composed of a single piece of sheet material.

Furthermore, in the airbag device M of the illustrated embodiment, the seam allowance 82*a* of the central joint 82 which joints the far-side edges (right edge 77*b* and left edge 78*a*) of the protruding-side component 77 and main-side component 78 together is located on the upper side of the outer tether 76. This configuration will prevent the seam allowance 82*a* from being engaged with the passenger's head MH at airbag deployment. Since the airbag 15 is designed to catch and receive the passenger's head MH with the arresting recess 43 beneath the outer tether 76, if the outer tether is disposed at a far higher position and is unlikely to contact with the head, the central joint may be formed on the lower side of the outer tether 76.

Figure 21:
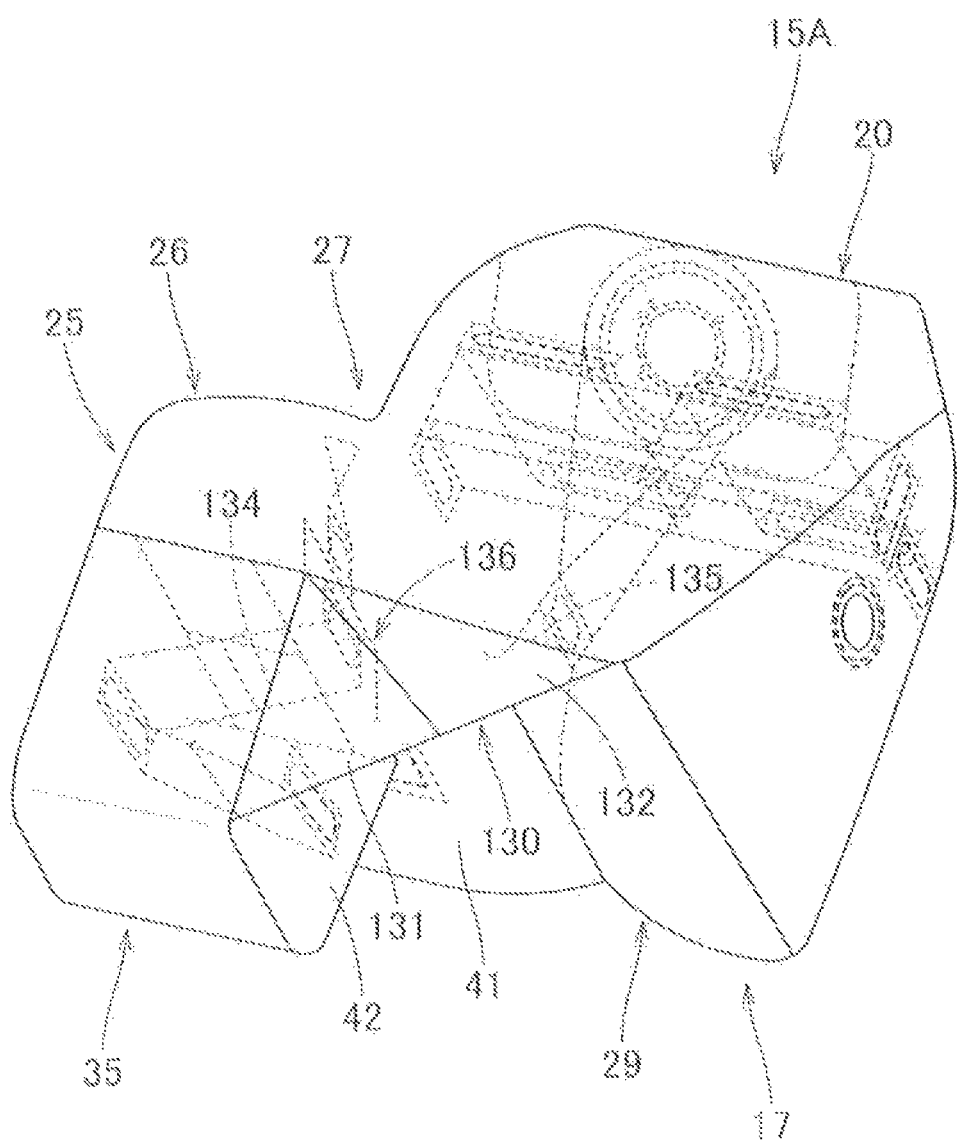
FIG. 21 is a perspective view of an airbag according to another embodiment of the invention as inflated by itself.
Figure 22:
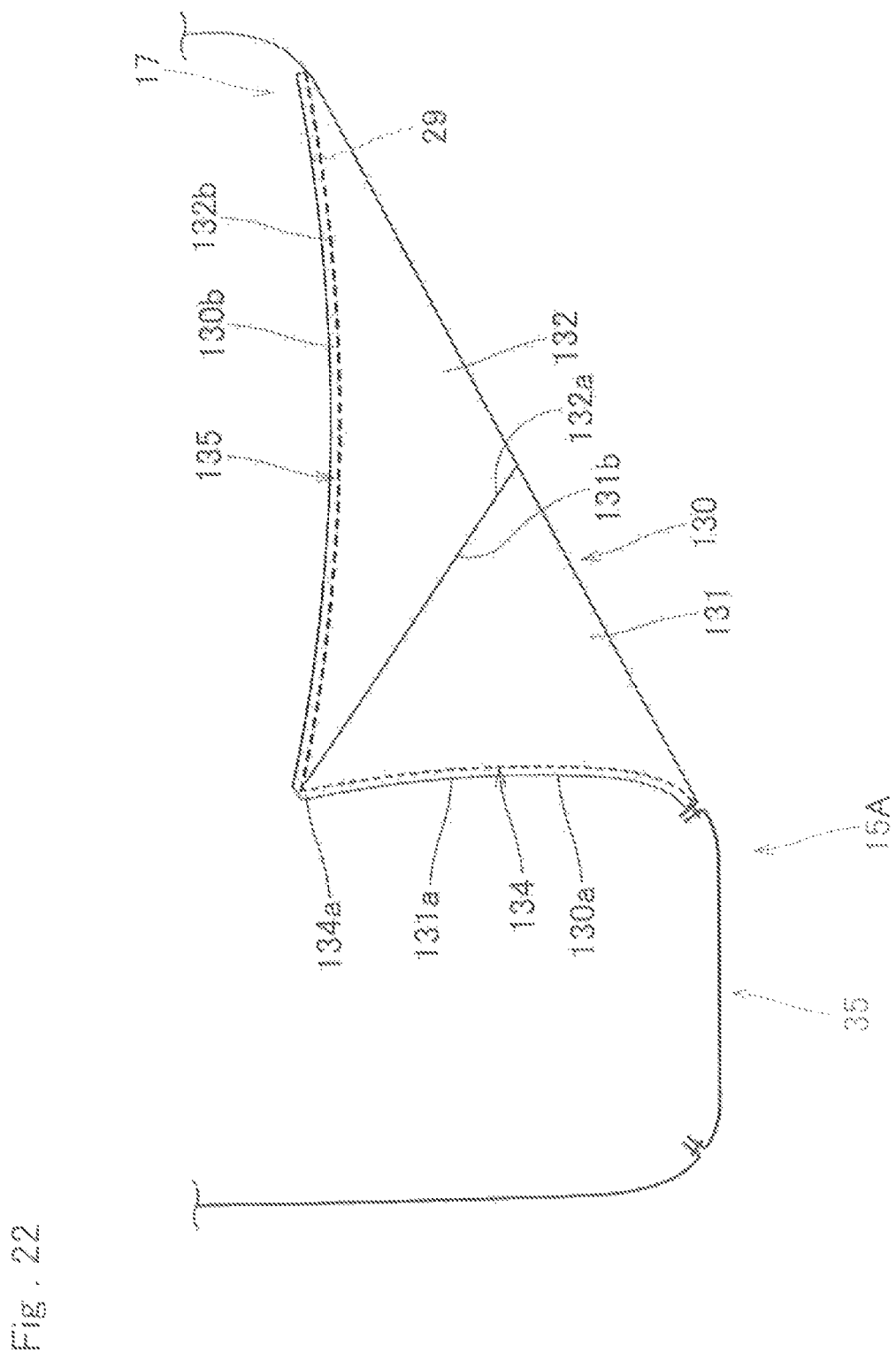
FIG. 22 is a partial enlarged schematic horizontal sectional view of the airbag of FIG. 21 showing the disposition of an outer tether.

FIGS. 21 and 22 depict an airbag 15A, an alternative embodiment, in which a front edge 130*b* of an outer tether 130 is jointed to a generally entire area in a left and right direction of the main inflatable section 17. The airbag 15A has a similar configuration to the airbag 15 of the foregoing embodiment except in the outer tether 130, and therefore, members except the outer tether 130 will be given common reference numerals and will not be described in detail. In a similar fashion to the airbag 15 of the foregoing embodiment, the outer tether 130 is composed of a protruding-side component 131 which is disposed towards the protruding inflatable section 35 and a main-side component 132 which is disposed towards the main inflatable section 17, and the outer tether 76 is formed by jointing together a right edge 131b of the protruding-side component 131 and a left edge 132a of the main-side component 132 by a central joint 136. The outer tether 130 is jointed to the main inflatable section 17 with a front joint 135 and is jointed to the protruding inflatable section 35 with a side joint 134. The side joint 134 joints a side edge 130a of the outer tether 130 (i.e. a left edge 131a of the protruding-side component 131) to the protruding inflatable section 35. The front joint 135 is continuous with the front end 134a of the side joint 134 and joints the front edge 130b of the outer tether 130 (i.e. the front edge 132b of the main-side component 132) thoroughly to the main inflatable section 17.

Figure 23:
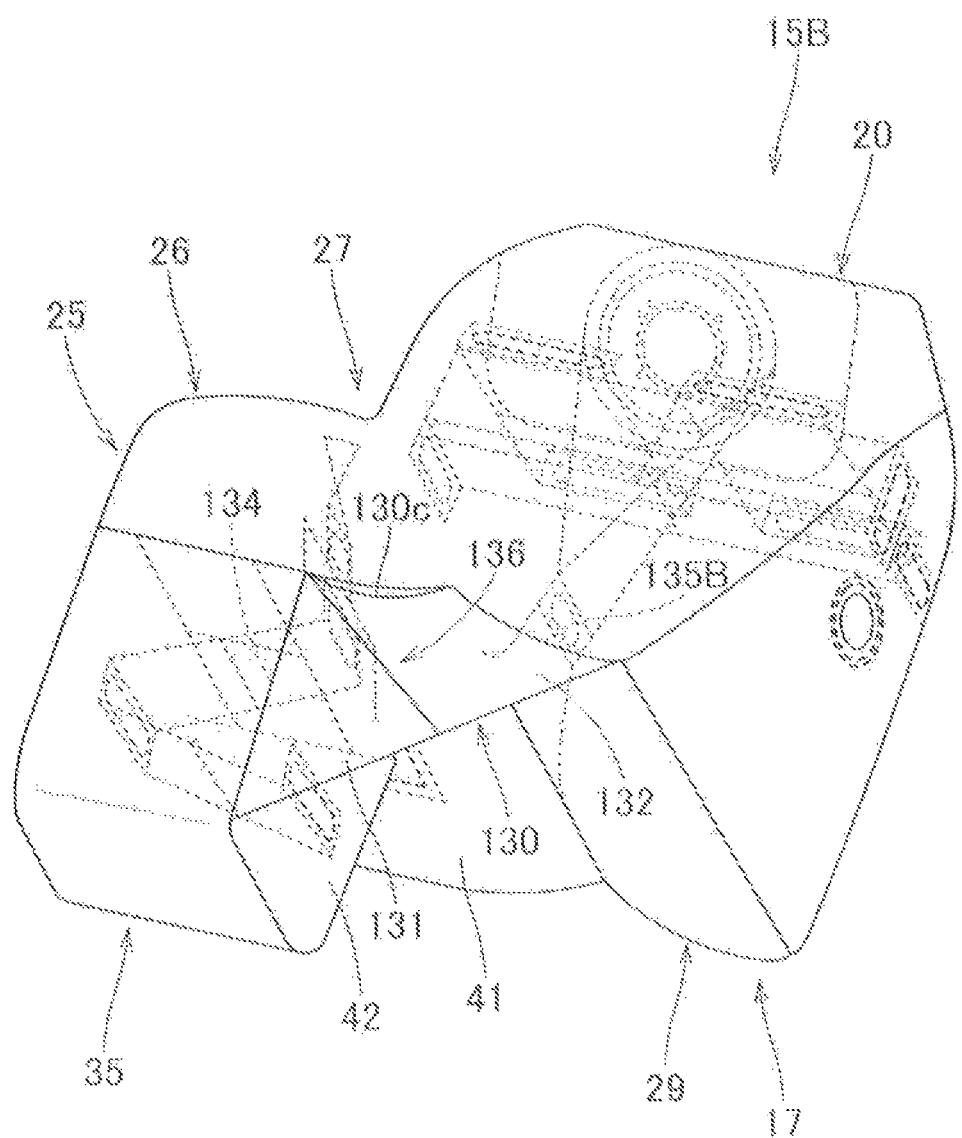
FIG. 23 is a perspective view of an airbag according to yet another alternative embodiment of the invention as inflated by itself.

FIGS. 23 and 24 depict an airbag 15B, another alternative embodiment. The airbag 15B includes an outer tether 130 whose front edge 130b is disposed over a generally entire area in a left and right direction of the main inflatable section 17. A front joint 135B, which joints the front edge 130b to the main inflatable section 17, is configured separate from the side joint 134 and joints a part of the front edge 130b of the outer tether 130 to the main inflatable section 17. In the airbag 15B, the front joint 135B is formed in a generally right half area of the front edge 130b of the outer tether 130, separately from the front end 134a of the side joint 134. The front edge 130b of the outer tether 130 has an unjointed region 130c at the generally left half area between the front end 134a of the side joint 134 and a left end 135a of the front joint 135B.

In the airbag device M, the auxiliary inflatable section (i.e. the left region 25 of the main inflatable section 17) is disposed on a side of the main inflatable section 17 facing towards the center in the width direction of the vehicle V (i.e. on the left side of the main inflatable section 17). The auxiliary inflatable section includes, at the region deployable towards the dashboard 1 (i.e. in front of the protruding inflatable section 35), the supporting inflatable section 26 which supports the front side of the protruding inflatable section 35, and the supporting inflatable section 26 includes the circumventing recess 27 which is configured to circumvent the monitor 3 (i.e. an object which protrudes upward out of the dashboard 1). Accordingly, when mounted on a vehicle V equipped with a monitor 3 protruding out of the dashboard 1, the airbag 15 will be smoothly deployed without being engaged with the monitor 3. Further, the airbag 15 of the airbag device M includes the supporting inflatable section 26 which supports the front side of the protruding inflatable section 35 and the outer tether 76 which prevents the protruding inflatable section 35 from moving away from the main inflatable section 17. With this configuration, when the arresting recess 43 arrests the passenger's head MH, although the circumventing recess 27 is located forward of the protruding inflatable section 35, the front portion of the protruding inflatable section 35 will be adequately supported by the supporting inflatable section 26, and the protruding inflatable section 35 will be prevented from moving away from the main inflatable section 17. Accordingly, the head MH will be arrested by the arresting recess 43 in a steady fashion. If such an advantageous effect does not have to be considered, the airbag may be configured without a circumventing recess.

Moreover, in the foregoing embodiment, the protruding inflatable section 35 is disposed only on the side of the main inflatable section 17 facing towards the driver's seat DS. In other words, the oblique-collision arresting face 42 and the arresting recess 43 are disposed towards the driver's seat DS with respect to the front-collision arresting face 41. This configuration will help protect the head MH of the front seat passenger MP adequately when the passenger MP moves diagonally forward towards the center in a width direction of the vehicle V in the event of an oblique collision or an offset collision. Although the passenger protection region 40 of the airbag 15 of the foregoing embodiment has the oblique-collision arresting face 42 and the arresting recess 43 only on the side facing towards the driver's seat DS with respect to the front-collision arresting face 41 (i.e. on the left side of the front-collision arresting face 41), if the above-described advantageous effects do not have to be considered, the location of the oblique-collision arresting face and the arresting recess should not be limited thereby. By way of example, the oblique-collision arresting face and the arresting recess may be disposed only on the right side of the front-collision arresting face facing towards an outboard side, not towards the driver's seat. They may also be disposed on both left and right sides of the front-collision arresting face.

What is claimed is:

1. An airbag device for a front passenger seat adapted to be mounted on an instrument panel of a vehicle in front of a front passenger seat, the airbag device comprising a housing adapted to be disposed in the instrument panel and an airbag which is housed in the housing in a folded-up configuration and inflatable with an inflation gas for rearward deployment, the airbag comprising:

a main inflatable section deployable rearward out of the housing and comprising a rear plane that forms a front-collision arresting face for protecting a head of a passenger in the event of a frontal collision of the vehicle;

an auxiliary inflatable section that is deployable on a left or right side of the main inflatable section;

a protruding inflatable section that is deployable at the rear of the auxiliary inflatable section in such a manner as to protrude further rearward than the main inflatable section, the protruding inflatable section comprising a near-side wall that rises rearward out of the front-collision arresting face and faces towards the front-collision arresting face at airbag deployment, the near-side wall forming an oblique-collision arresting face for protecting the head of the passenger in the event of an oblique collision or an offset collision of the vehicle;

an arresting recess that is formed between the front-collision arresting face and the oblique-collision arresting face in such a manner as to be recessed forward for receiving and arresting the head of the passenger; and an outer tether that is disposed on an outside of the main inflatable section and protruding inflatable section for preventing the protruding inflatable section from moving away from the main inflatable section at airbag deployment, the outer tether having a generally sectorial outer contour, wherein the outer tether comprises:

a side edge that is disposed over a generally entire area in a front and rear direction of an upper edge region of the near-side wall of the protruding inflatable section;

a side joint which joints the side edge of the outer tether to an upper edge region of the oblique-collision arresting face and is formed over a generally entire area in a front and rear direction of the protruding inflatable section;

a front edge; and a front joint that joints the front edge of the outer tether to an upper edge region of the front-collision arresting face of the main inflatable section, wherein:

the outer tether is composed of a protruding-side component to be disposed towards the protruding inflatable section and a main-side component to be disposed towards the main inflatable section;

the outer tether is formed by jointing together, at a central joint, a far-side edge of the protruding-side component located away from the side joint and a far-side edge of the main-side component located away from the front joint, and the central joint, which joints together the far-side edge of the protruding-side component and the far-side edge of the main-side component, is deployed at a slant with respect to a front and rear direction, and a front end of the central joint is located at an arresting recess side away from a rear end of the central joint.

2. The airbag device for a front passenger seat of claim 1, wherein the front joint is continuous with a front end of the side joint and is formed generally all over the front edge.

3. The airbag device for a front passenger seat of claim 1, wherein:

the front joint is formed separately from a front end of the side joint; and the front edge of the outer tether has an unjointed region between the front end of the side joint and the front joint.

4. The airbag device for a front passenger seat of claim 1, wherein:

the auxiliary inflatable section is formed only either on the left side or on the right side of the main inflatable section as deployed; and the front edge of the outer tether is disposed over a generally entire area in a left and right direction of the main inflatable section.

5. The airbag device for a front passenger seat of claim 4, wherein the auxiliary inflatable section is disposed on a side of the main inflatable section facing towards a driver seat at airbag deployment.

6. The airbag device for a front passenger seat of claim 5, wherein:

the auxiliary inflatable section includes, at a region thereof deployable towards the instrument panel, a supporting inflatable section that supports a front side of the protruding inflatable section; and the supporting inflatable section includes a circumventing recess that is configured to circumvent an object which protrudes upward out of the instrument panel.

7. The airbag device for a front passenger seat of claim 1, wherein a seam allowance of a joint of the far-side edges of the protruding-side component and main-side component is located on an upper side of the outer tether.

8. The airbag device for a front passenger seat of claim 1, wherein an end of the front joint is arranged at the general center in the left and right direction of the front-collision arresting face.

\* \* \* \* \*